United States Patent [19]
Yoshihara et al.

[11] Patent Number: 5,208,627
[45] Date of Patent: May 4, 1993

[54] RECORDING APPARATUS

[75] Inventors: Yoshihiko Yoshihara, Yokohama; Masahiro Shirai, Tokyo, both of Japan

[73] Assignee: Canon Kabushiki Kaisha, Tokyo, Japan

[21] Appl. No.: 851,189

[22] Filed: Mar. 13, 1992

[30] Foreign Application Priority Data

Mar. 13, 1991 [JP] Japan .................................. 3-48098
Mar. 13, 1991 [JP] Japan .................................. 3-72077
Oct. 31, 1991 [JP] Japan .................................. 3-311450

[51] Int. Cl.⁵ ...................... G03B 27/32; G03B 27/52; G03B 27/48; G03B 27/50
[52] U.S. Cl. ...................... 355/23; 355/46; 355/51; 355/65
[58] Field of Search .................. 355/46, 23, 51, 65

[56] References Cited

U.S. PATENT DOCUMENTS

| 2,552,266 | 5/1951 | Egan et al. | 355/23 |
| 2,578,320 | 12/1951 | Schubert | 355/23 |
| 4,035,073 | 7/1977 | Del Vecchio | 355/24 |
| 4,864,420 | 9/1989 | Aiko | 358/302 |
| 4,984,008 | 1/1991 | Frystak et al. | 355/24 |

Primary Examiner—Richard A. Wintercorn
Attorney, Agent, or Firm—Fitzpatrick, Cella, Harper & Scinto

[57] ABSTRACT

A recording apparatus for recording images of an object on a plurality of recording media records the object images on the recording media at different reduction factors. It also records an object image independently on each of the recording media.

17 Claims, 18 Drawing Sheets

RECORDING APPARATUS

BACKGROUND OF THE INVENTION

1. Field of the Invention

The present invention relates to a recording apparatus for recording an image of an object on an elongated recording medium such as a microfilm.

2. Related Background Art

A rotary camera has been known as a typical example of such a recorder. It is described below.

In the rotary camera, documents to be stored in a microfilm such as notes, checks, share certificates or ordinary documents are sequentially transported one by one, image information of the objects is sequentially recorded on an elongated film, and the recorded objects are ejected from the camera. In this manner, a large number of image of the objects can be quickly recorded on the elongated film loaded in the camera.

It is used in a financial industry such as banks to record various data and documents on a microfilm to maintain and manage them and prepare for a possible accident.

An apparatus which has a plurality of photographing units to permit simultaneous photographing on a plurality of films has also been known.

Three photographing methods for the rotary camera have been known. They are a simplex photographing method in which only one-side image of an object is photographed at a relatively low factor such as 1/25, a duplex photographing method in which front and back sides of the object are simultaneously photographed at a relatively high factor such as 1/50, and a due photographing method in which one side of an object is photographed on a lower half area of a film in which a front side of the object is to be photographed in the duplex photographing method, then the film is reversed, and the one side of the object is further photographed in the remaining half area of the film in which a back side of the object is to be photographed in the duplex photographing method.

In the prior art apparatus which has a plurality of photographing units, the photographing is made on two films simultaneously, the films are developed, and only one of them is used while the other is retained as a spare or back-up in case the film is lost. This increases the photographing cost.

Recently, a digital imaging apparatus which digitizes an image to record it on a magneto-optic disk or a tape has been put into practice. In the digital imaging apparatus, the image can be recorded on a medium which is reusable by erasing the back-up. Thus, the increase of the cost in the rotary camera due to the back-up film raises a problem.

Further, depending on an object of use such as record keeping of important data or frequent data retrieval, a dupe film which is a copy of an original film is needed in addition to the original film for the purpose of safety of record keeping.

When a dupe film which is a copy of the original film is to be prepared, a dupe apparatus has been used in the past. Further, instead of using the dupe apparatus, a dual film rotary camera in which two long films are loaded in the camera and images of objects are simultaneously photographed on the two films may be used.

However, in the prior art dual film photographing apparatus, the dual film photographing may not be necessary depending on a user, a type of object (data) to be photographed or an object of use of the microfilm. For example, where the need for maintenance is not so high or the retrieval is not required, one original film may be sufficient while taking the economy of the film into account.

In such a case, only one film is used in the dual film photographing apparatus. This is waste of space and the dual film photographing apparatus is not effectively utilized.

SUMMARY OF THE INVENTION

It is an object of the present invention to provide a photographing apparatus which uses a plurality of films and permits simultaneous photographing with different reduction factors.

In order to achieve the above object, the photographing apparatus of the present invention has a plurality of photographing units to permit simultaneous reduction photographing of an image of an object on a plurality of long films, and the photographing units operate in different manners in response to one command from a control unit.

The manners of operation of the photographing units may correspond to the reduction factors of photographing.

The photographing apparatus of the present invention permits simultaneous photographing with different reduction factors such as a high factor and a low factor, for a plurality of films.

The photographing apparatus of the present invention which permits effective recording of images on a plurality of recording mediums comprises drive means for independently driving a plurality of recording media, detection means for detecting a remainder of each of the recording media, recording means for recording an image on each of the recording media and means for switching to cause recording on another medium when the detection means detects that the reminder of one recording medium has reached a predetermined level.

DETAILED DESCRIPTION OF THE PREFERRED EMBODIMENTS

A first embodiment of the present invention is now explained with reference to FIGS. 1 to 9.

Figure 1:
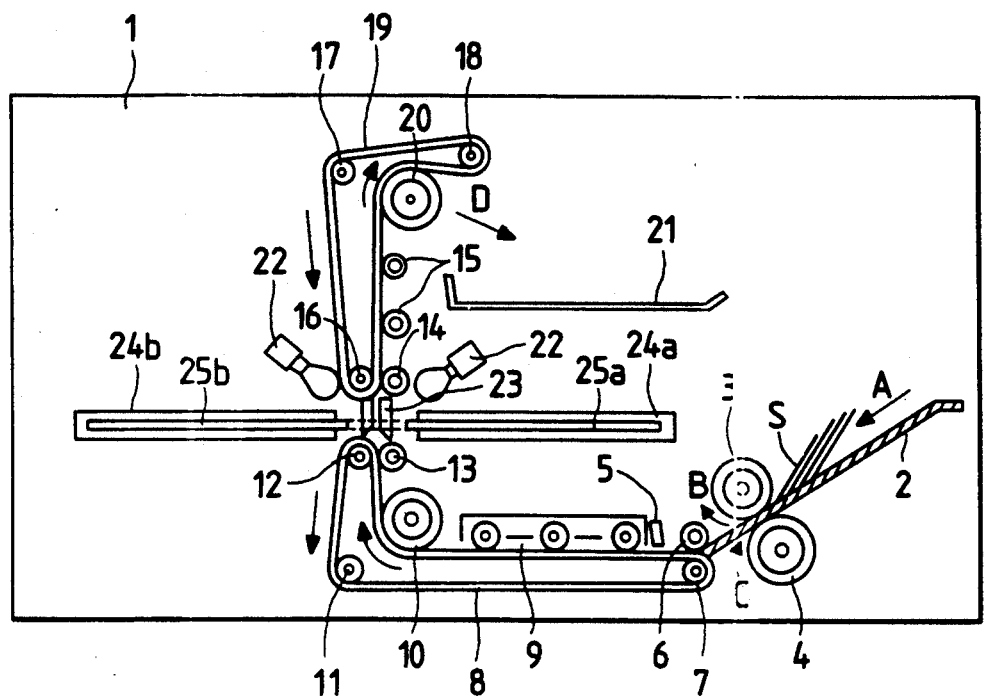
FIG. 1 shows a sectional view of a first embodiment of a photographing apparatus of the present invention.

FIG. 1 shows a configuration of an object transport unit of a photographing apparatus 1. When a sheet-like object S is placed on a feed tray 2 which is inclined downward, it is moved by a gravity in a direction A. The objects S are separated and fed one by one by a separation roller 4 which is rotated in the opposite direction C to the direction B of rotation of a feed roller 3.

A lower conveyer belt 8 is spanned between belt rollers 7 and 12 and a tension thereof is appropriately maintained by a tension roller 11. The object S is transported by the rotation of a lower drive roller 10 and pushed against the transport belt 8 by an idle roller 6 and a guide unit 9. An object detection unit 5 which detects the transport object S is arranged between the idle roller 6 and the guide unit 9. The object detection unit 5 is used to control a shutter 39a of a camera unit 40a shown in FIG. 5.

The object S transported from horizontally to vertically by the lower transport belt 8 passes through a guide glass 23 and is illuminated by a pair of illumination lamps 22 simultaneously on both sides thereof when it passes through the guide glass 23. Nip rollers 13 and 14 are provided above and below the guide glass 23. An upper transport belt 19 is spanned between belt rollers 16 and 18 and an appropriate tension thereof is maintained by a tension roller 17. As the upper drive roller 20 is rotated, the object S transported through the guide glass 23 is transported upward and urged against the transport belt 19 by an idle roller 15.

The object S changes its transport path from vertical to horizontal by the upper transport belt 19, travels in a direction D and is ejected to an ejection tray 21.

First mirrors 24a and 24b which are inclined by 45 degrees to the left and the right, respectively, with respect to the plane of the object S which is vertically moved are symmetrically arranged on both sides of the guide glass 23 which is a light exposure unit. The first mirrors 24a and 24b are supported by a base structure (not shown) in a body of the photographing apparatus 1 as is the roller shaft for transporting the object.

Figure 2:
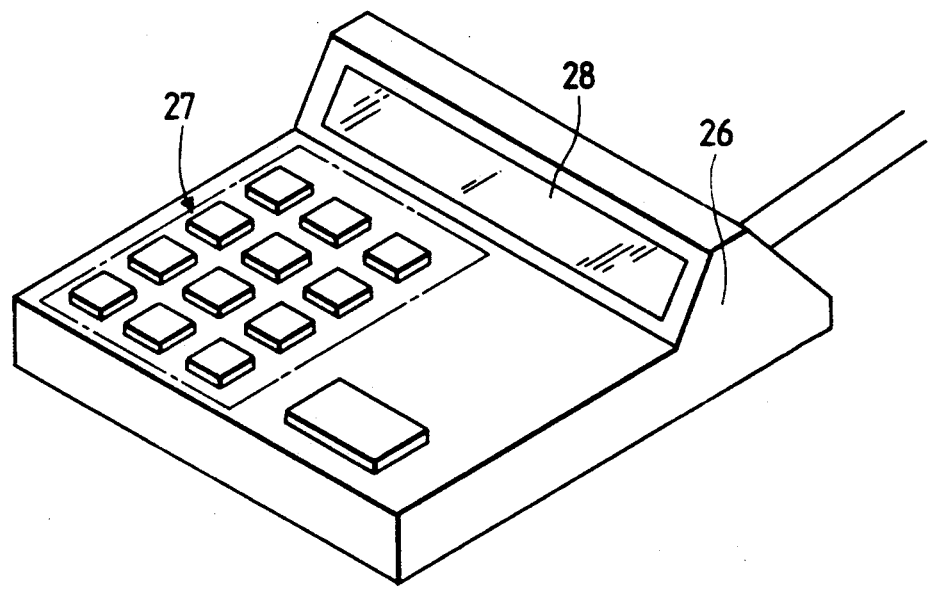
FIG. 2 shows a perspective view of a console unit.

FIG. 2 shows a perspective view of a console unit 26 for manipulating the photographing apparatus 1. The console unit 26 comprises a keyboard 27 and a display 28 and it is electrically connected to a control unit to be described later to control the photographing apparatus 1 by the key manipulation of the keyboard 27 through the control unit.

Figure 3:
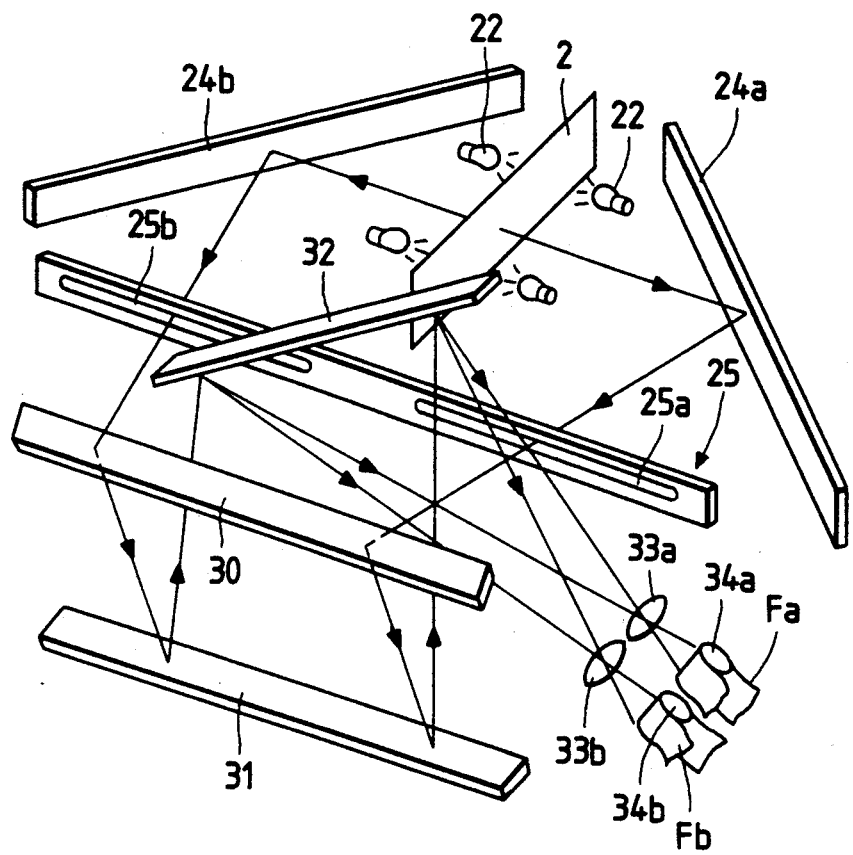
FIG. 3 shows a configuration of an optical system.

FIG. 3 shows a perspective view of a mirror unit of the optical system of the photographing apparatus 1. Images of both sides of the object S illuminated by an illumination lamp 22 in a light exposure unit are reflected by the first mirrors 24a and 24b, pass through slits 25a and 25b of a slit plate 25, respectively, and are reflected obliquely downward by a second mirror 30.

The image is again reflected by a third mirror 31 vertically upward and is reflected by a fourth mirror 32 obliquely downward. The image reflected by the fourth mirror 32 passes through projection lenses 33a and 33b and is projected and focused to films Fa and Fb which are driven by capstan rollers 34a and 34b in camera units 40a and 40b shown in FIGS. 4 and 5.

Figure 4:
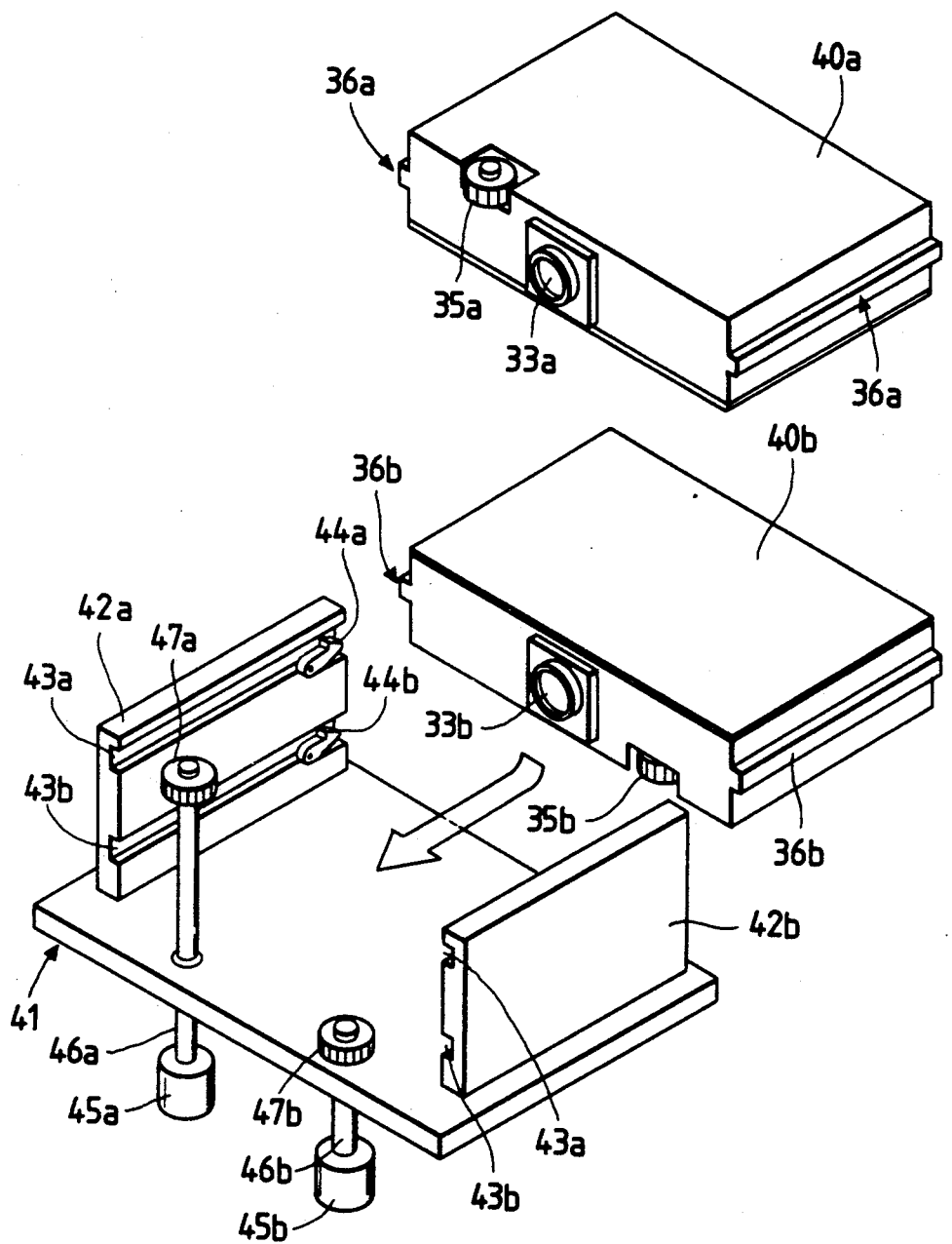
FIG. 4 shows a configuration of a camera and a camera drive unit.

FIG. 4 shows a perspective view of the camera units 40a and 40b and a drive unit therefor.

The first and second camera units 40a, and 40b have projection lenses 33a and 33b of different magnifications, connecting gears 35a and 35b and a pair of positioning ribs 36a and 36b which are inserted into a pair of guide grooves 43a and 43b formed on camera guides 42a and 42b secured to a camera chassis 41. The camera units 40a and 40b are secured by camera locking pawls 44a and 44b.

The connecting gears 35a and 35b of the secured camera units 40a and 40b are coupled to drive gears 47a and 47b, respectively, which are secured to rotating shafts 46a and 46b through camera drive motors 45a and 45b and rotating shafts 46a and 46b. When the drive motors 45a and 45b are energized, the films Fa and Fb loaded in the camera units 40a and 40b are transported.

When the camera units 40a and 40b are mounted on the camera chassis 41, they couple connectors (not shown) to make electrical connections.

Figure 5:
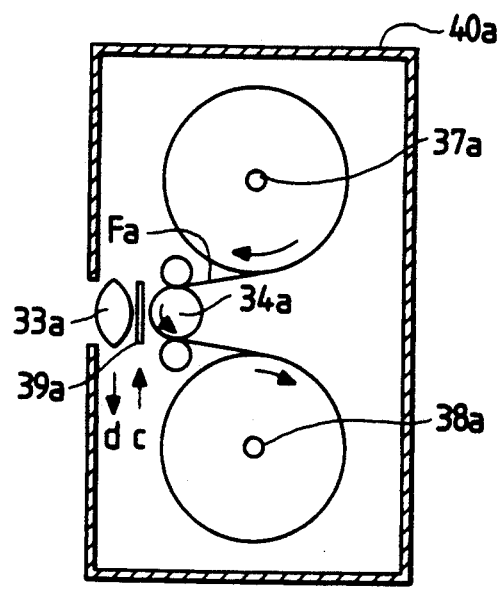
FIG. 5 shows a sectional view of the camera.

FIG. 5 shows an internal configuration of the first camera unit 40a. The second camera unit 40b has the same configuration.

The first camera unit 40a has the projection lens 33a and the film feeding capstan roller 34a. The film Fa fed out of a supply reel 37 on which an unexposed film is wrapped is exposed to an image of the object focused by the projection lens 33a and a shutter 39a at the position of the capstan roller 34a and is taken up by a take-up reel 38a.

The capstan roller 34a is coupled to the camera drive motor 45a through the connecting gears 35a and 47a shown in FIG. 4 to transport the film Fa at a speed determined by a product of a transport speed of the object and a reduction factor. The rotation speed of the capstan roller 34a is selected such that the reduced projected image and the film are in synchronism.

The film feeding capstan roller 34b in the second camera unit 40b is coupled to the camera drive motor 45b through the connecting gears 35b and 47b and transports the film Fb loaded in the camera unit 40b at a different speed than that of the capstan roller 34a.

The camera units 40a and 40b are speed-reduced in accordance with the reduction factors thereof by the connecting gears 35a and 35b and gears (not shown) between the capstan rollers 34a and 34b. Accordingly, the films in the camera units are fed at the speeds corresponding to the reduction factors of the camera units by driving the camera drive motors 45a and 45b at a constant speed proportional to the object transport speed without regard to the reduction factors of the camera units 40a and 40b.

The shutters 39a and 39b of the camera units are coupled to solenoids (not shown) and project the object image to the films Fa and Fb or block the exposure when they are driven to the directions c and d, respectively.

In the present embodiment, the first camera unit 40a and the second camera unit 40b have different reduction factors. In one example of the combination, the first camera unit 40a has a photographing lens of a reduction factor of 1/25 and is used for the simplex photographing, and the second camera unit 40b has a photographing lens of a reduction factor of 1/50 and is used for the duo photographing.

Figure 8:
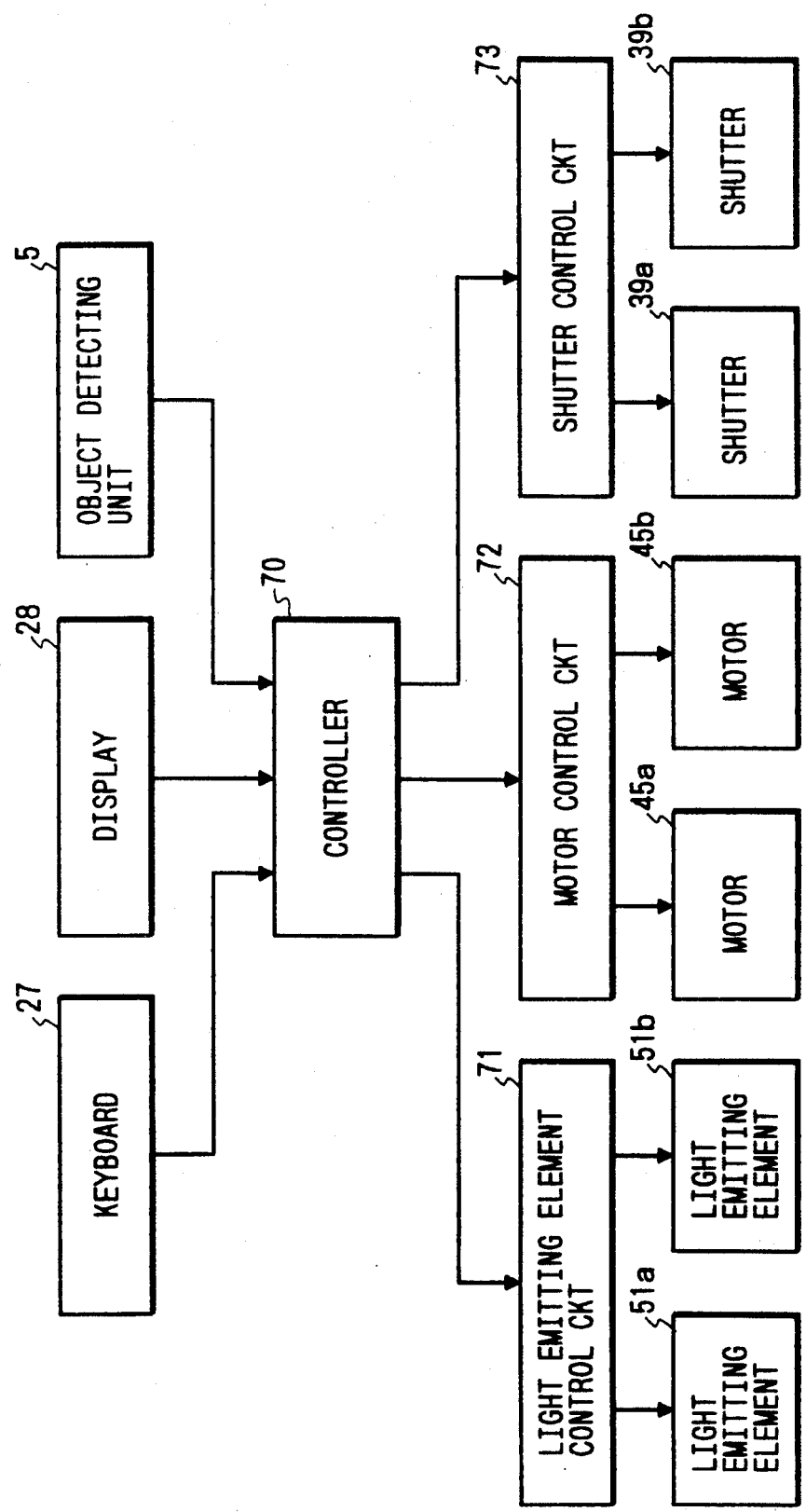
FIG. 8 shows a block diagram of a control circuit in the first embodiment.

FIG. 8 shows a block diagram of a control circuit of the photographing apparatus. A control unit 70 controls a display 28 in accordance with a command and an input from a keyboard 27 and a signal from an object detection unit 5, controls light emitting elements 51a and 51b through a light emitting element control circuit 71, controls motors 45a and 45b through a motor control circuit 72 and controls shutters 39a and 39b through a shutter control circuit 73.

Figure 9:
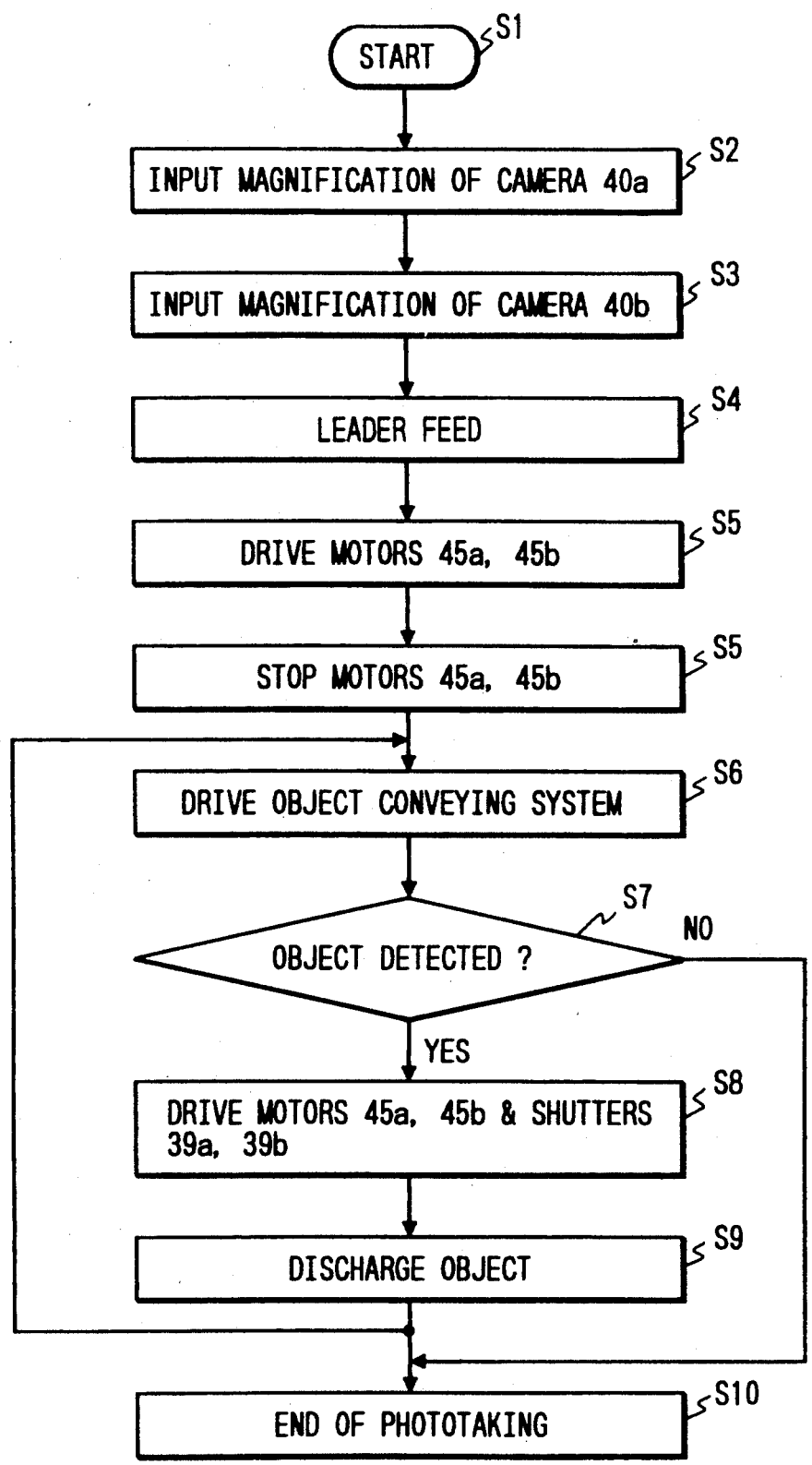
FIG. 9 shows a flow chart of the first embodiment.

FIG. 9 shows a flow chart of an operation of the first embodiment.

Films are loaded in the camera units 40a and 40b which are then mounted on the guide grooves 43a and 43b. The start of photographing is commanded by the keyboard 27 (step S1) and magnifications or reduction factors of the camera units are entered from the keyboard 27. Namely, the reduction factor of 1/25 is set to the first camera unit 40a (step S2), and the reduction factor of 1/50 is set to the second camera unit 40b (step S3).

Before photographing the object, the films must be fed (leader feeding) after the camera units 40a and 40b have been mounted on the photographing apparatus 1 in order to take up the areas of the films loaded in the camera units 40a and 40b which have been exposed during the loading.

Figure 6:
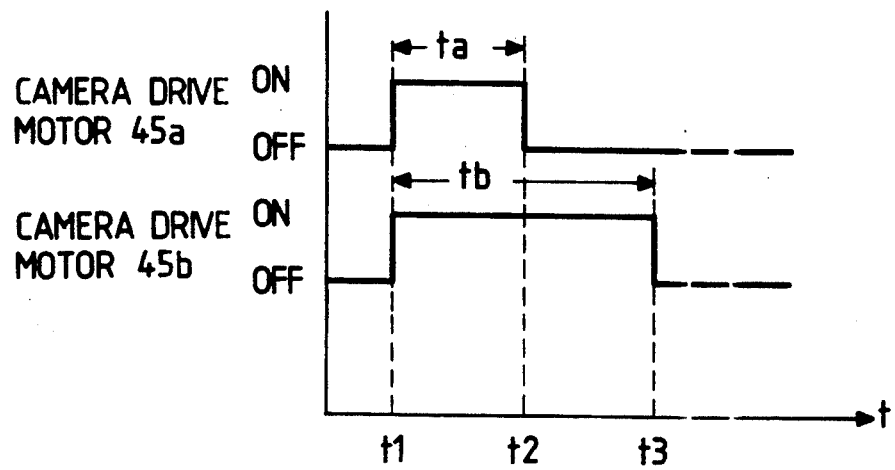
FIG. 6 shows a time chart of a camera drive motor in a leader feed mode.

FIG. 6 shows a time chart of the camera drive motors 45a and 45b when the operator commands the loader feed to the camera units from the keyboard.

At a time t1, the camera drive motors 45a and 45b are energized (step S5) by the leader feed command from the operator (step S4) to start the leader feed of the films. Since the camera units 40a and 40b have reduction gears corresponding to the reduction factors as described above, the feed amounts of the films are different even though the camera drive motors 45a and 45b are rotated at the same rotating speed.

In the present embodiment, since the camera unit 40a has the reduction factor of 1/25 and the camera unit 40b has the reduction factor of 1/50, the camera unit 40a feeds double length of film of the film fed in the camera unit 40b when the camera drive motors are rotated at the same rotating speed.

On the other hand, the leader feed is to feed the portion of the film which has been exposed when the film was loaded, and the required amount of feed is constant at approximately 1.5 m without regard to the reduction factor of the camera unit.

Accordingly, the first camera unit 40a is permitted to feed the film for the leader feed at a time t2, and after the drive for ta period, the drive of the camera drive motor 45a is stopped (step S5).

The second camera unit 40b must drive the camera drive motor 45b for twice as much as the rotation by the camera drive motor 45a. It is permitted to feed the film for the reader feed at a time t3, and after the drive for tb period, the drive of the camera drive motor 45b is stopped (step S5). Accordingly, where the rotating speeds of the camera drive motors 45a and 45b are equal, the period tb is twice as long as the period ta.

After the leader feed, the object transport or conveying unit is activated (step S6) and the feed roller 3 is rotated to feed one sheet of the objects S. A predetermined time after the object detection unit 5 has detected the object (step S7), the motors 45a and 45b are energized for predetermined time periods so that the films are fed at the preset speed and the shutters 39a and 39b are released for a preset time period (step S8) and the object is projected to the films Fa and Fb. When the object is discharged or ejected to the ejection tray 21 (step S9), the above operation is repeated until all of the objects on the feed tray 2 have been projected. When no object to be projected is detected, the photographing process is terminated (step S10).

Figure 7:
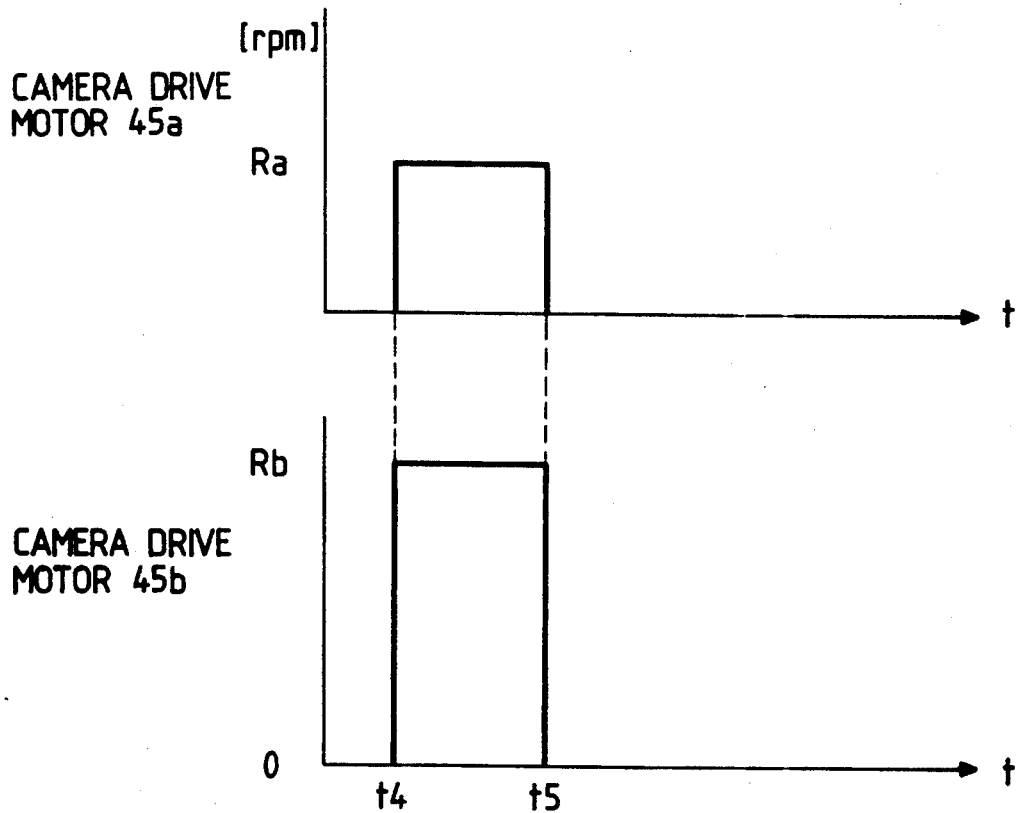
FIG. 7 shows a time chart of the camera drive unit in the leader feed mode in a second embodiment of the present invention.

FIG. 7 shows a time chart for a second embodiment of the present invention. The like elements to those in the first embodiment are designated by the like numerals.

In the present embodiment, the rotating speeds of the camera drive motors 45a and 45b are different so that the leader feeds of the camera units 40a and motors 45a and 45b are energized from a time t4 to a time t5, and the rotating speed Ra of the camera drive motor 45a is one half of the rotating speed Rb of the camera drive motor 45b. Accordingly, the camera drive motor 45b is rotated twice as much as the rotation of the camera drive motor 45a so that the films are fed by the same length.

In the above embodiments, the leader feed is effected to feed the portion of film which has been exposed during the loading of the film. This technique may also be applied to the trailer feed in which the film is fed when the film is to be unloaded in order to prevent the exposed film from being reexposed by an external light. The drive by the camera unit need not be done by the separate camera drive motor but it may be done by the object transport motor which has a controllable coupling element such as an electromagnetic clutch or a spring clutch built in the coupling unit. In this manner, the same control as that of the first embodiment can be attained.

Figure 10:
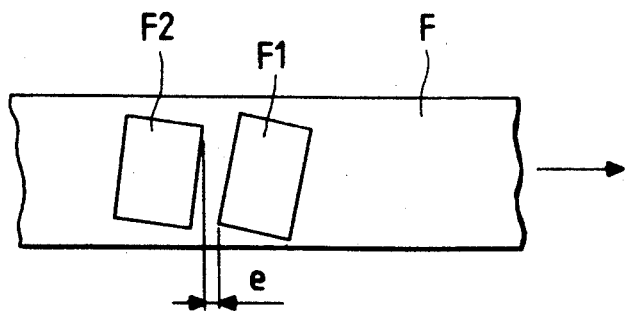
FIG. 10 shows a film photographing status in a third embodiment of the present invention.
Figure 11:
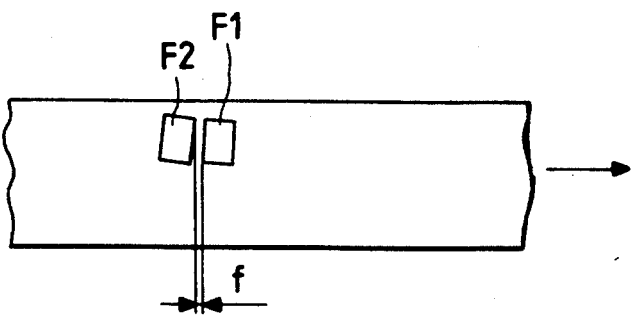
FIG. 11 shows another film photographing status.
Figure 12:
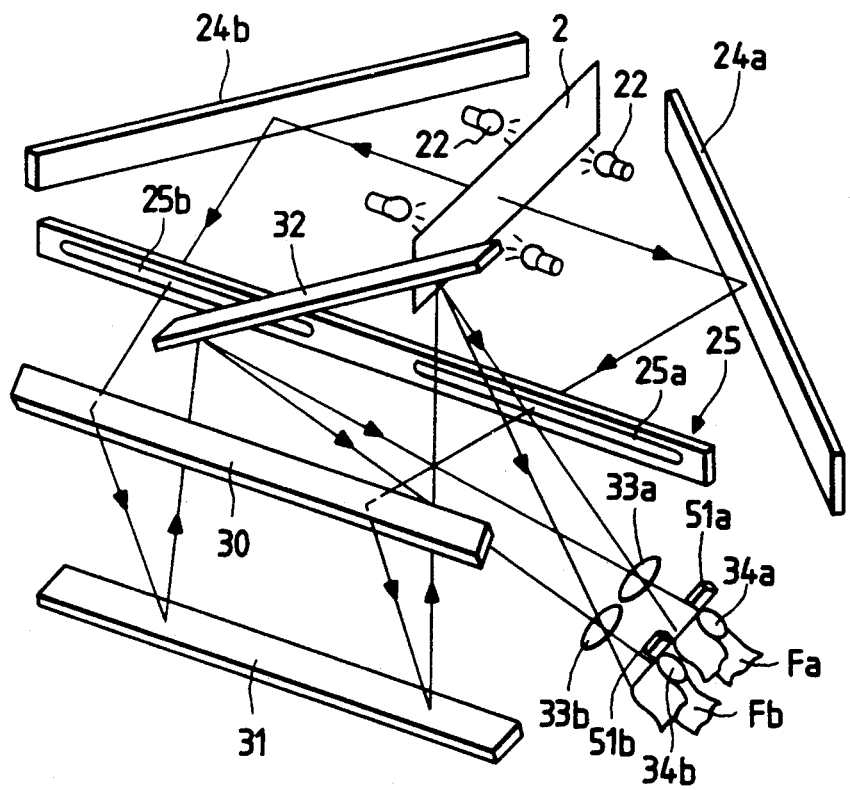
FIG. 12 shows a configuration of an optical system in a fourth embodiment of the present invention.

FIGS. 10 and 11 show a third embodiment of the present invention.

FIG. 10 shows a film F on which objects have been photographed one by one intermittently. A manner of photographing when the apparatus of the first embodiment is used is described below. In FIG. 1, the sheet-like object S transported into the photographing apparatus 1 through the feed roller 3 is detected by the object detection unit 5 and it is further transported into the apparatus 1. The CPU (not shown) responds to the object detection signal from the object detection unit 5 to energize the camera drive motor 45a shown in FIG. 5 a predetermined time (a time required for the object S to reach the photographing unit) the object detection signal, and retract the shutter 39a in the direction d and projects the image F1 of the object S onto the film F.

When the object detection unit 5 produces an object non-detection signal, the CPU drives the shutter 39a in the direction c a predetermined time after the non-detection signal to block the light, and deenergizes the film drive motor 45a.

The above operation is repeated again to form the film F shown in FIG. 8. An interval e between the images F1 and F2 is determined by a margin to prevent the overlapping due to the skew of the objects S and the backlash of the drive unit and the delay of start and stop of the motor due to the intermittent feed of the film.

Accordingly, where the second camera unit 40b having the reduction factor of 1/50 is operated under the same control condition as that of the first camera unit 40a having the reduction factor of 1/25, the margin required to prevent the overlapping due to the skew of the object S depends on the reduction factor but the delay in the drive unit does not depend on the reduction factor and the same margin is required on the film. Accordingly, if the first camera unit 40a and the second camera unit 40b are driven for the same period, the film feed is short in the camera unit 40b in which the film feed amount in the given time period is smaller so that the interval f between the images F1 and F2 shown in FIG. 11 is so small that there is a risk of the overlapping of the images due to the error in the drive unit.

Accordingly, in the second camera unit 40b having the reduction factor of 1/50, the film feed should be stopped after the feed for a somewhat longer time period than that of the first camera unit 40a in accordance with the film feed speed of the camera unit 40b.

FIGS. 12 to 15 show a fourth embodiment of the present invention. The film elements to those shown in the first embodiment are designated by the like numerals and only the differences are explained below.

Figure 13:
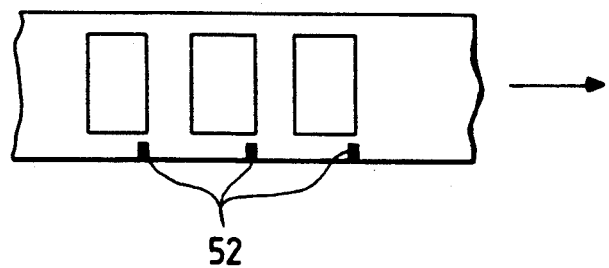
FIG. 13 shows a film having retrieval marks recorded thereon.

In the present embodiment, light emitting devices 51a and 51b are arranged closely to the capstans 34a and 34b to permit the recording of a retrieval mark 52 on each of the images on the film F as shown in FIG. 13.

Widths of a large mark, a middle mark and a small mark of the retrieval marks 52 on the film are defined by the Japan Microfilm Association and the American Standards Association.

Figure 14:
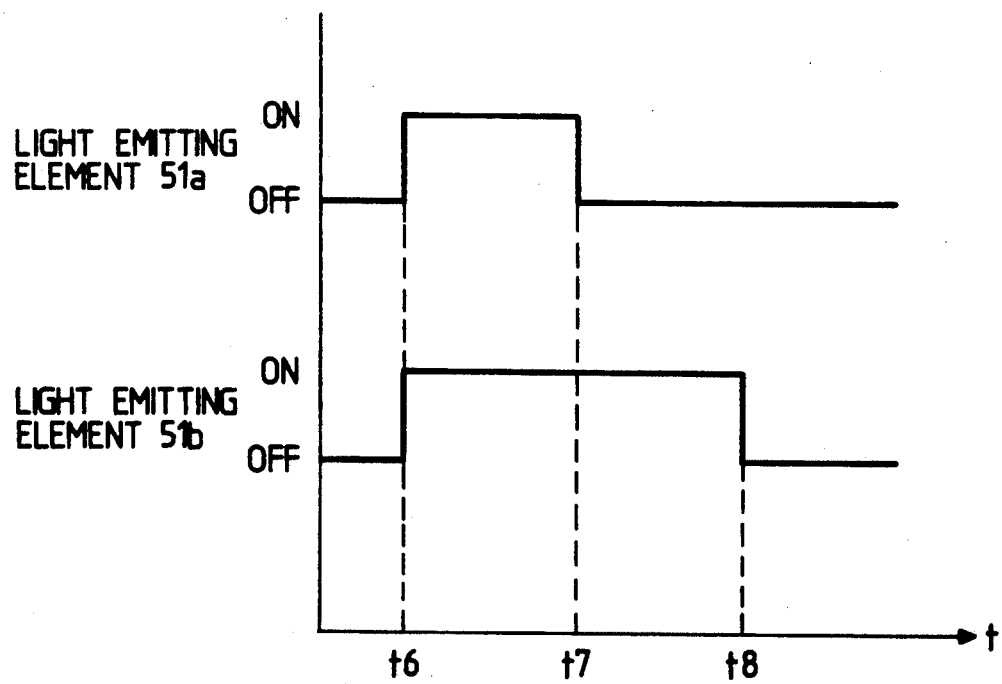
FIG. 14 shows a drive time chart of a light emitting device for photographing the retrieval mark.

Since the film transport speeds of the camera unit 40a and the camera unit 40b are different, in order to record the same retrieval mark 52 on the film by the light emitting device 51a built in the camera unit 40a having the reduction factor of 1/25 and the light emitting device 51b built in the camera unit having the reduction factor of 1/50, the light emitting device 51a of the camera unit 40a having the reduction factor of 1/25 should emit a light from t6 to t7 while the light emitting device 51b of the camera unit 40b having the reduction factor of 1/50 should emit a light from t6 to t8 as shown in FIG. 14. Since the camera unit 40a transports the film at twice the speed of that of the camera unit 40b, the time period t7-t6 is one half of the time period t8-t6.

In the above embodiment, the camera units having different reduction factors are used. Where the camera units having the same reduction factors are used, the small mark may be recorded in one camera unit and the middle mark may be recorded in the other camera unit in order to prevent the mix-up of the normally used film and the back-up film. In this manner, the normally used film and the back-up film are distinguished.

In the above case, the light emission times of the light emitting devices 51a and 51b may be varied in accordance with the widths of the small mark and the middle mark.

In the above embodiment, the gear ratios of the camera units are different from each other to control the transport speeds of the films. Alternatively, the gear ratios of the camera units may be equal but the speeds of the motors 45a and 45b may be varied in accordance with the reduction factors. In this case, the speeds of the motors 45a and 45b are determined based on the reduction factors entered by the keyboard 27.

In the present embodiment, the photographing apparatus which has a plurality of photographing units and which can simultaneously photograph the images of the object onto a plurality of long films with reduction factors permits the operation in accordance with the reduction factors of the cameras by a single command from the control unit even when the photographing units (cameras) having different reduction factors are mounted. For example, when a camera of a low reduction factor and a camera of a high reduction factor are combined, the film photographed by the low reduction factor camera which has a higher resolution may be normally used, and in case of trouble, the back-up film photographed at a high density which has a lower resolution may be used. In this manner, a cost required for the back-up film which is not normally used is reduced and the space is also reduced.

The reduction of the cost and the saving of the space described above are important particularly when the camera for the low reduction factor simplex photographing and the camera for the high reduction factor duo photographing are combined.

By recording different marks by using the cameras having the same reduction factor, the normally used film and the back-up film can be readily distinguished by the marks on the films at the same reduction factor.

FIGS. 15-20 show an embodiment which uses camera units having the same reduction factor. The objects are photographed by one camera unit, and when a remainder of the film in the one camera unit reaches a predetermined level, the objects are photographed by the other camera unit.

Figure 15:
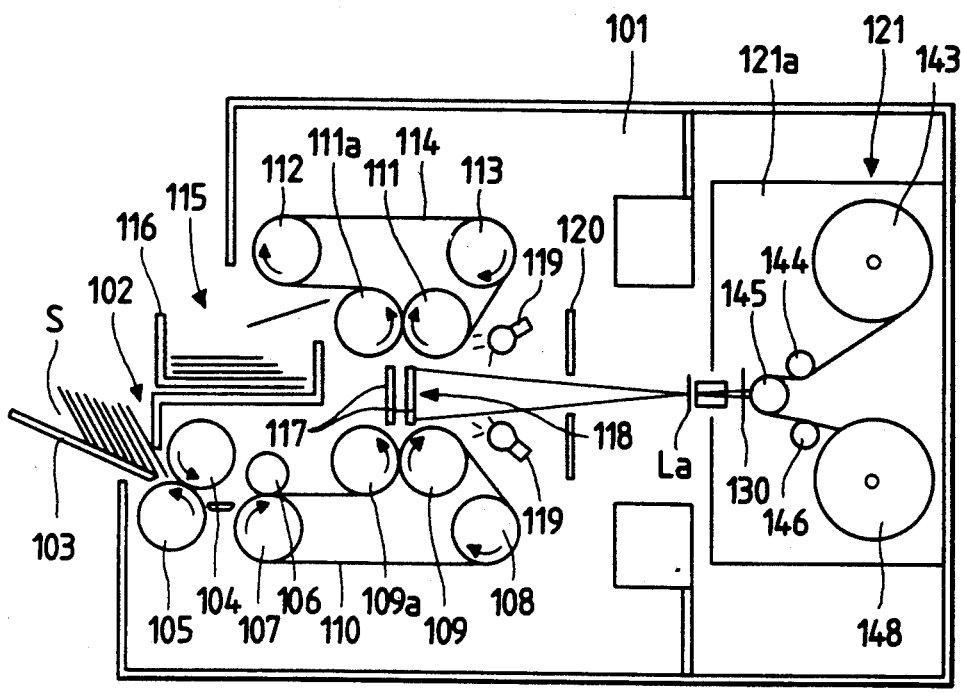
FIG. 15 shows a configuration of other embodiment of the present invention.

In FIG. 15, the sheet-like objects S stacked on a stacking plate 103 of a feed unit 102 of a body of a photographing apparatus 101 are separated and fed one by one by a feed roller 104 and the separation roller 105. The fed object S passes through an upstream transport unit which comprises first rollers 106 and 107, second rollers 109 and 109a, a tension roller 108 and a conveyer belt 110 and is transported to a downstream transport unit which comprises third rollers 111 and 111a, an ejection roller 112, a tension roller 113 and a conveyer belt 114, and the object S ejected from the ejection unit 115 is stacked in the ejection tray 116.

On the other hand, an object exposure unit 118 comprising parallel guide glass plates 117 are arranged between the upperstream transport unit and the downstream transport unit. Arranged behind the object exposure unit 118 are an illumination lamp 119 for illuminating the object S, a slit 120 for defining a light path and a camera unit 121 to be described later.

Figure 16:
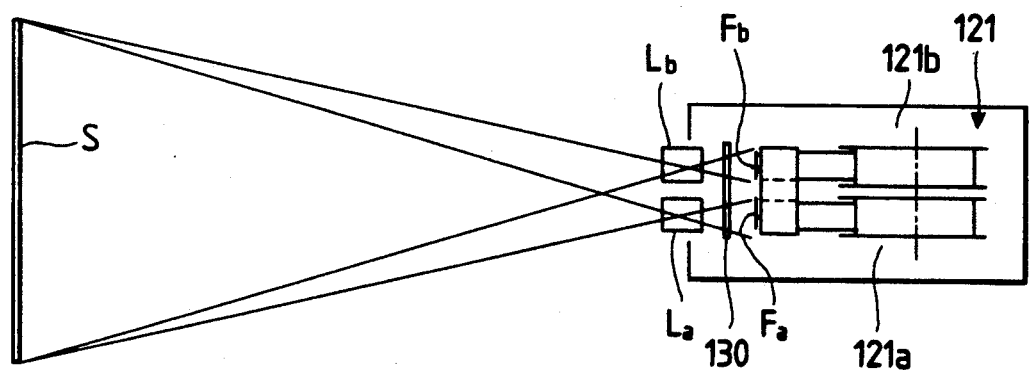
FIG. 16 shows a configuration of a camera unit.

As shown in FIG. 16, two camera units 121a and 121b are mounted in the camera unit 121 to slit-expose the image information of the object S which passes through the object exposure unit 118 onto two films, that is, films Fa and Fb in the camera units 121a and 121b, respectively.

Figure 17:
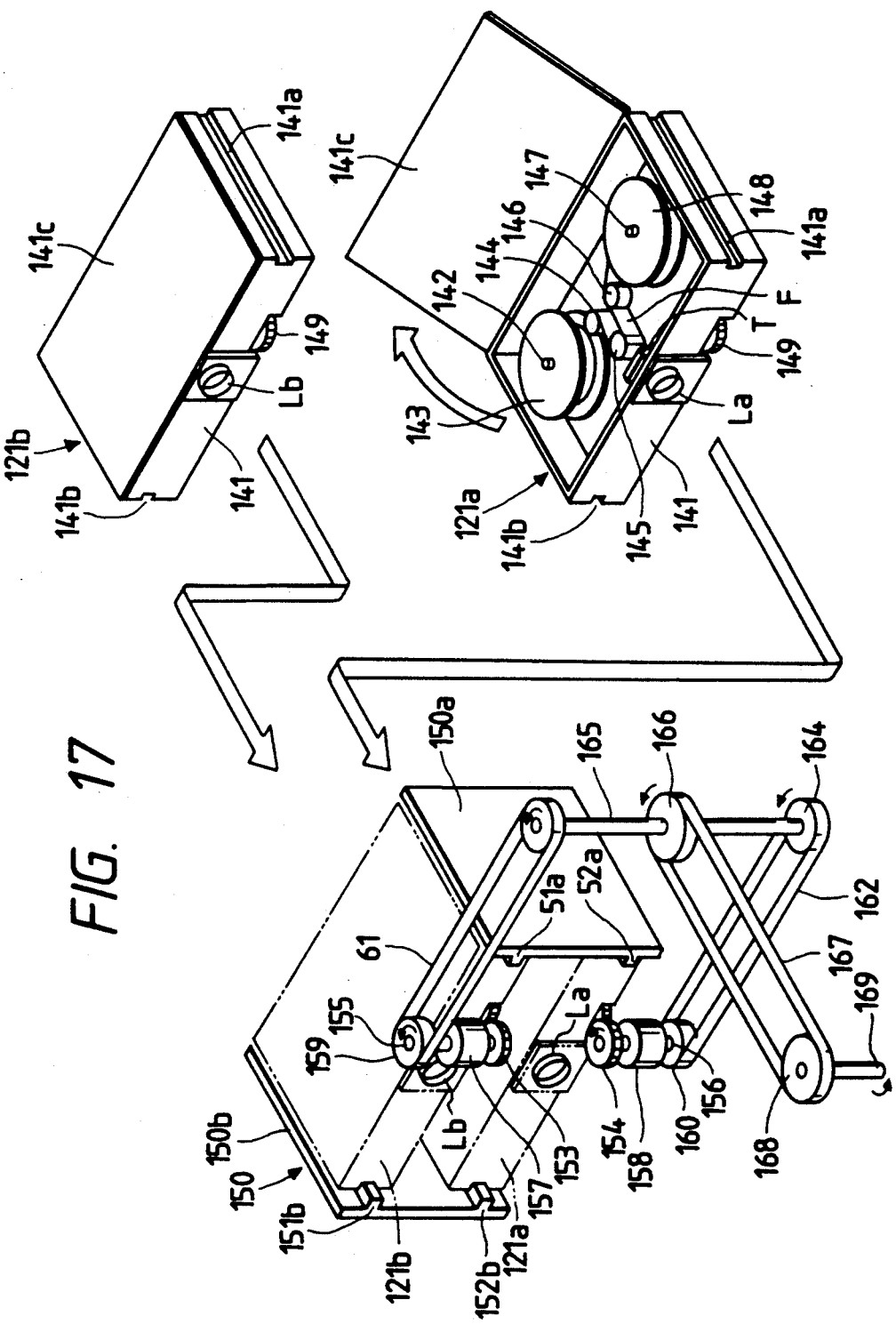
FIG. 17 shows a configuration of a film drive unit of a dual film photographing apparatus of the present invention.
Figure 18:
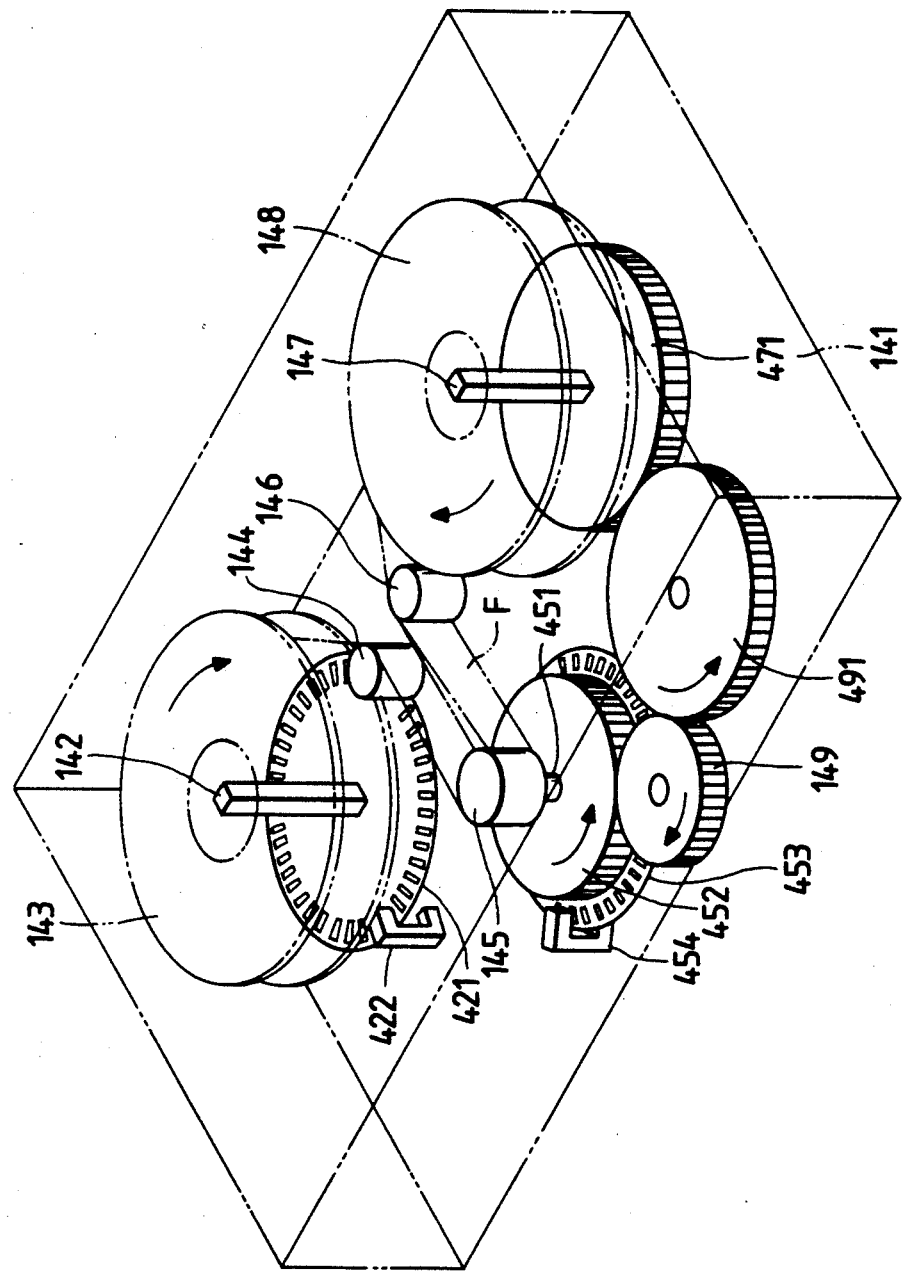
FIG. 18 shows a perspective view of a camera unit of the film photographing apparatus of the present invention.

FIGS. 17 and 18 show the camera unit. FIG. 17 shows a perspective view of a film drive mechanism of the camera unit which is a principal unit of the present invention.

Two camera units 121a and 121b of the identical construction are mounted on the camera unit 121. Each of the camera units has a film housing unit 141 and a photographing lens La or Lb, and the housing units and the lenses are of identical construction. The film housing unit 141 of the first camera unit 121a has the photographing lens La and a shutter T as well as a supply reel 143 mounted on a supply shaft 142, a take-up reel 148 mounted on a take-up shaft 147, guide rollers 144 and 146 and a capstan roller 145, which form a transport mechanism for the film F. The film housing unit 141 has a pivotable cover 141c, and guide grooves 141a and 141b on both sides thereof. The guide grooves 141a and 141b engage with first and second rails 151a, 151b, 152a and 152b of camera guide members 150a and 150b formed in a camera insertion unit of the body 50 of the apparatus to slide them. The camera units 121a and 121b are removable from the body of the apparatus through the sliding movement. A camera connecting gear 149 which transmits the drive force from the drive unit of the body to the camera unit, which serves as a camera drive unit, is mounted on a front of the film housing unit 141 mounted in the first camera unit 121a. In the engagement position of the camera connecting gear 149, it meshes with the drive gears 153 and 154 of the body. The drive gears 153 and 154 are secured to the drive shafts 155 and 156 and are coupled to the drive pulleys 159 and 160 which are similarly secured, through electromagnetic clutches 157 and 158.

On the other hand, when the pulley 168 secured to the shaft 169 is driven by a drive source (not shown) of the body of the apparatus, the drive force is transmitted to the pulley 166 through the belt 167. The rotation of the pulley 166 is transmitted to the pulleys 163 and 164 by the fixed shaft 165, and transmitted to the drive pulleys 159 and 160 through the belts 161 and 162.

FIG. 18 shows a film drive mechanism in the camera unit. A capstan gear 452 is mounted on a shaft 451 of a capstan roller 145 to engage with the camera connecting gear 149 to transmit the rotation to the capstan roller 145. The rotation of the camera connecting gear 149 is transmitted to a take-up gear 471 secured to a take-up shaft through an idler gear 491 so that the take-up shaft 147 is rotated. The rotation of the camera connecting gear 149 is transmitted to the take-up gear 471 secured to the take-up shaft 147 through an idler roller 491 so that the take-up shaft 147 is rotated. Encoders 421 and 453 and the photo-interrupters 422 and 454 are mounted on the supply shaft 142 and the capstan roller shaft 451, respectively. They constitute pulse generation means. Friction mechanisms (not shown) are provided on the supply shaft 142 and the take-up shaft 147 so that the film F is transported with an appropriate tension when the film diameters on the supply reel 143 and the take-up reel 148 vary.

Figure 19:
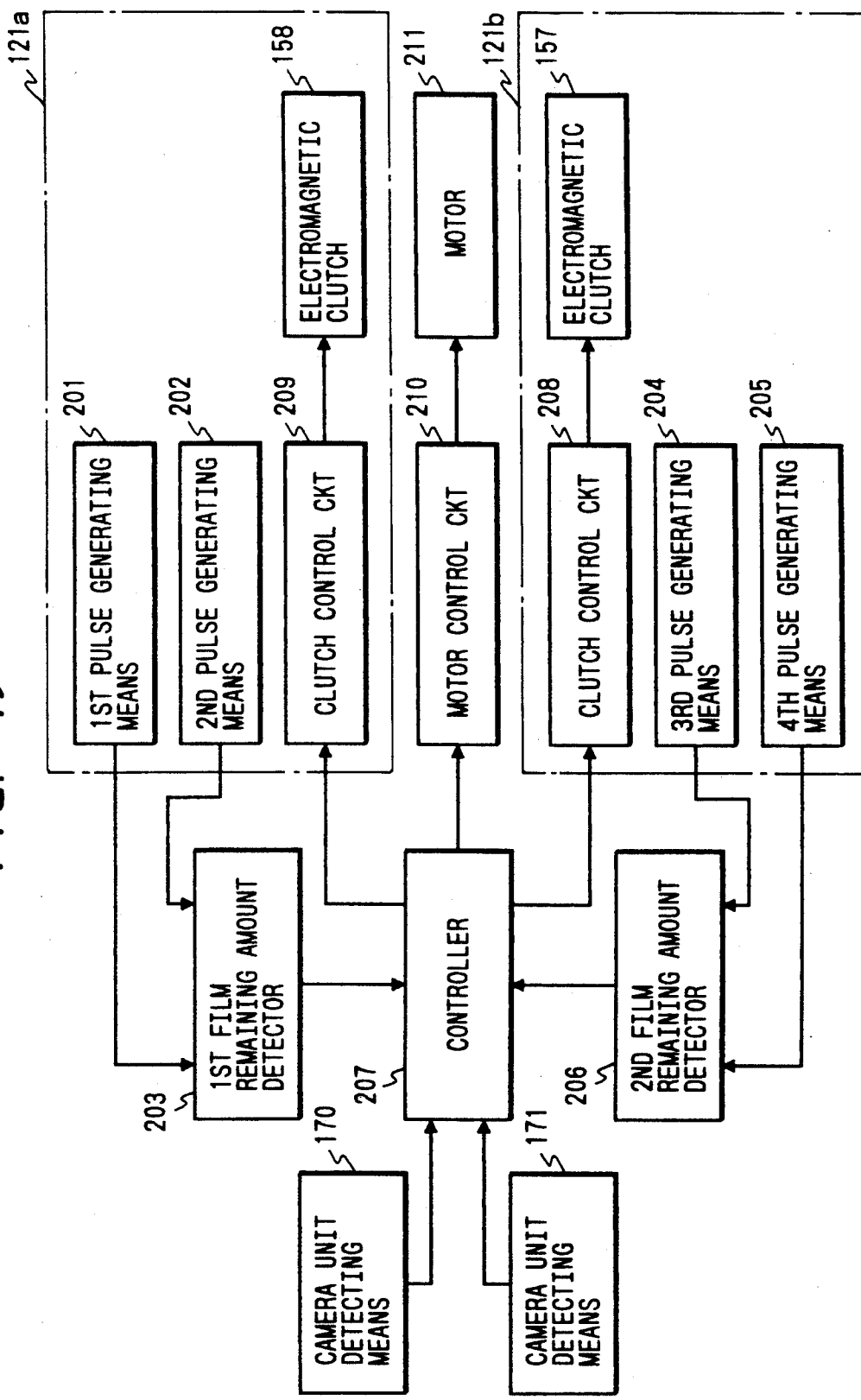
FIG. 19 shows a block diagram of a control circuit in the embodiment of FIGS. 15 to 18.

FIG. 19 shows a block diagram of a control circuit of the photographing apparatus. Numeral 201 denotes first pulse generation means including the encoder 421 and the photointerrupter 422 in the first camera unit 121a. It generates a pulse at each predetermined angle of rotation of the supply shaft 142. Numeral 202 denotes second pulse generation means including the encoder 453 and the photointerrupter 454 in the first camera unit 121a. It generates a pulse at each predetermined angle of rotation of the capstan roller shaft 451.

Numeral 203 denotes a first film remainder detector for detecting the amount of film wound on the supply reel in the first camera unit 121a. It compares the number of pulses generated by the first and second pulse generation means in a predetermined period to detect when the amount of film remaining on the supply reel 143 reaches a predetermined level. For example, if the number of pulses generated by the first pulse generation means 201 while the second pulse generation means 202 generates a predetermined number of pulses is smaller than a reference, it means that the remainder of the film wound on the supply reel 143 is large, and as the film remainder decreases, the number of pulses increases and when it exceeds the reference, it means that the film remainder is almost zero. Thus, the detector 203 produces a signal indicating that the remainder is small.

Numeral 204 denotes third pulse generation means which generates a pulse at each predetermined angle of rotation of the supply shaft 142 in the second camera unit 121b, numeral 205 denotes fourth pulse generation means which generates a pulse at each predetermined angle of rotation of the capstan roller shaft 451 in, the second camera unit 121b, and numeral 206 denotes a second film remainder detector which detects the amount of film wound on the supply reel 143 in the second camera unit 121b. They are constructed in the same manner as the first and second pulse generation means 201 and 202 and the first film remainder detector 203, respectively.

Numeral 207 denotes a control circuit for controlling the drive unit of the body, numeral 208 denotes a clutch control circuit for controlling a first electromagnetic clutch 157, numeral 209 denotes a clutch control circuit for controlling a second electromagnetic clutch 158, and numeral 210 denotes a motor control circuit for controlling a motor 211 of the drive unit of the body.

The control circuit 207 comprises a CPU and controls the drives of the motor 211 and the electromagnetic clutches 157 and 158 in accordance with the commands from the console unit and the outputs from the film detectors 203 and 204. Numerals 170 and 171 denote camera unit detection means which detect when the camera units 121a and 121b are mounted at the predetermined positions of the body 150, respectively.

Figure 20:
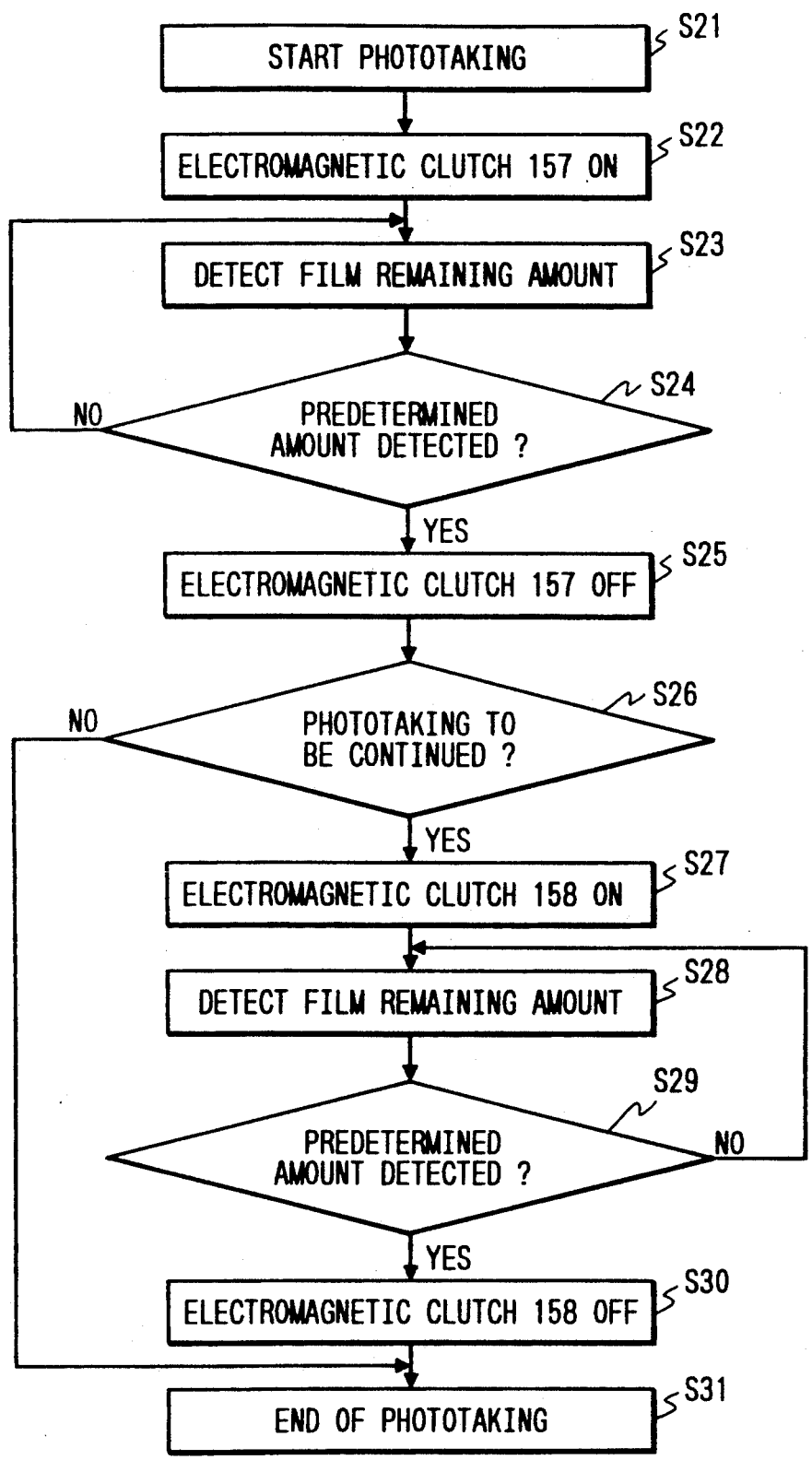
FIG. 20 shows a flow chart of the above embodiment.

FIG. 20 shows a flow chart of the present embodiment. Films are loaded into the film housing units 141 of the camera units 121a and 121b, which are then mounted on the body. First, the upper second camera unit 121b is used for photographing. The electromagnetic clutch 157 is actuated (step 22) by a start of photographing command (step 21) and the electromagnetic clutch 158 is deactuated so that the drive from the body 150 is transmitted to only the drive gear 153 to drive only the upper second camera unit 121b. Then, the photographing is proceeded and when the amount of film remaining on the supply reel 143 in the upper second camera unit reaches the predetermined level (the remaining film is zero or almost zero) (steps 23 and 24), the electromagnetic clutch 157 is deactuated (step 25) and the photographing by the upper second camera unit 121b is inhibited. When the electromagnetic clutch 158 is then actuated, only the lower first camera unit 121a is driven so that the photographing is made by the lower first camera unit to continue the photographing (steps 26 and 27). The photographing may be continued until the film in the first camera unit 121a is exhausted (steps 28, 29, 30 and 31).

By taking out the exposed upper camera unit to exchange the film and remounting it on the body during the photographing by the lower camera unit, the photographing may be continued by the upper camera unit after the photographing by the lower camera unit has been terminated.

In the present embodiment, the dual film photographing apparatus having two camera units is used although successive photographing may be made on films by a multi-film photographing apparatus having three or more camera units.

The remainder of the film during the photographing, that is, the remainder of the film F on the supply reel 143 may be detected by measuring the time intervals of the pulses generated by the encoders 421 and 453 and the photo-interrupters 422 and 454 mounted on the supply shaft 142 and the capstan roller shaft 451 of the camera unit, respectively, in synchronism with the rotations of the respective shafts, and comparing the measured time intervals and the changes thereof. As the film F is transported and the film diameter on the supply reel 143 decreases, the rotation speed of the supply shaft 142 increases. Thus, by detecting a predetermined rotating speed, the zero remainder can be detected and the end of photographing is detected.

The remainder detection means is not limited to the one shown in the present embodiment but various other known methods may be used.

The recording medium is not limited to the microfilm but various other recording media may be used.

Figure 21:
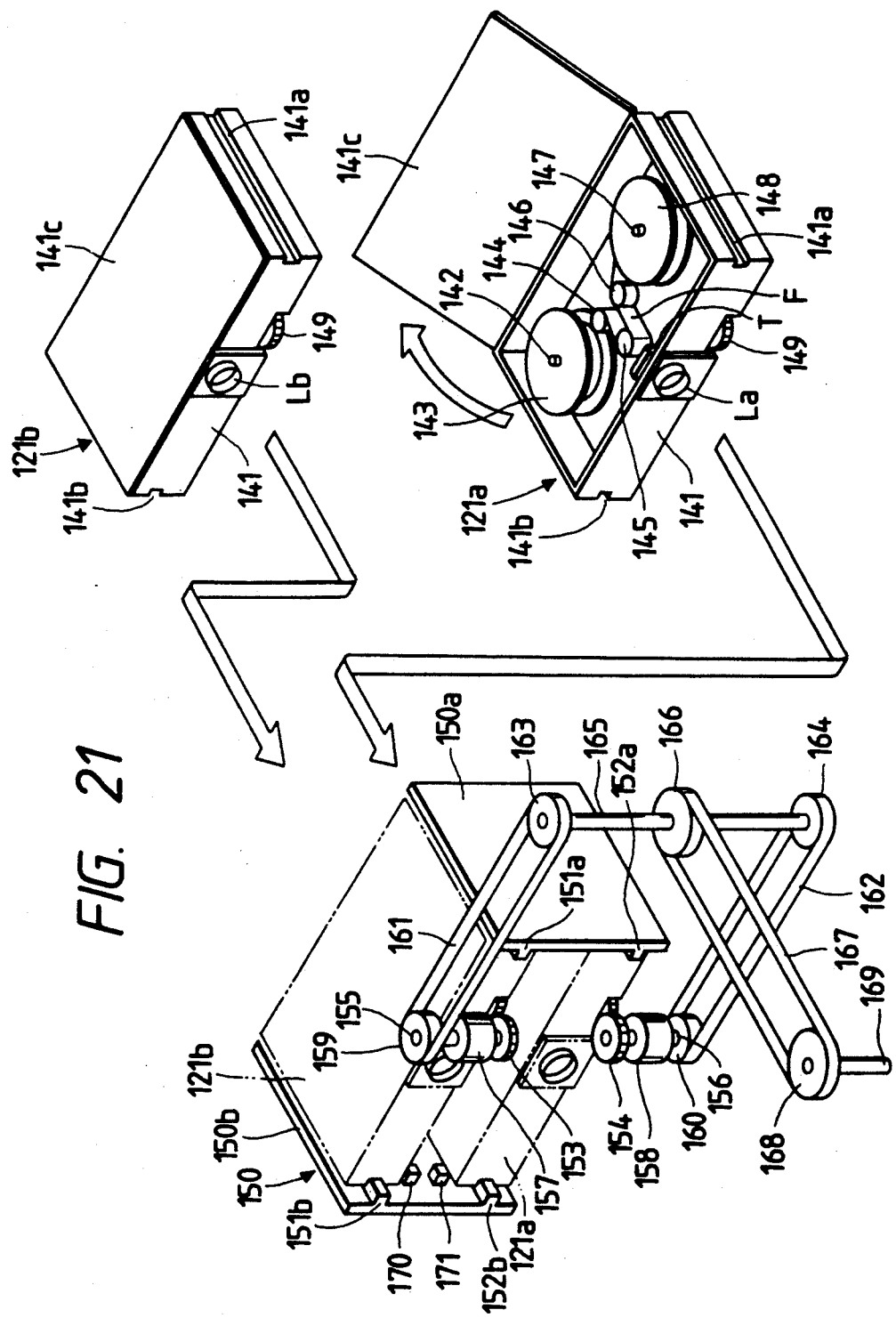
FIG. 21 shows a perspective view of another embodiment.

FIG. 21 shows other embodiment of the present invention.

The present embodiment is of the identical configuration as that of the previous embodiment except that the previous embodiment activates the other camera unit to switch the photographing when the remainder of the film in one camera reaches the predetermined level and the photographing is terminated while the present embodiment activates the other camera unit during or immediately before the termination of the photographing by the one camera unit to start the leader feed of the film so that the photographing by the other camera unit is started immediately after the termination of the photographing by the one camera unit. Continuous sequential photographing may be attained by making the trailer feed of the film of the one camera unit when the photographing by the other camera unit is started.

Even if the object is being fed or transported when the photographing is switched from one camera unit to the other camera unit, the sequential photographing can be efficiently done without stopping the feed or transport of the object.

The leader feed of the film may be done by detecting the mount of the camera unit on the body 150 by the camera unit detection means 170 and 171 such as reflection type photo-sensors mounted on the camera guide members 150a and 150b of the body 150 when the camera unit having the film loaded therein is mounted on the body, and actuating the electromagnetic clutches 157 and 158 in response to the detection signals to drive the camera units. In this manner, the switching of the photographing by the camera unit can be smoothly and efficiently attained.

When it is desired to simultaneously record the same object on two films, that is, when dupe film is to be simultaneously produced, a dupe photographing mode is selected to simultaneously actuate the clutches 157 and 158 for feeding both films to attain the simultaneous dual film photographing, and when the independent photographing is desired, an independent photographing mode is selected to permit the independent photographing to each of the films as is done in the present embodiment.

Figure 22:
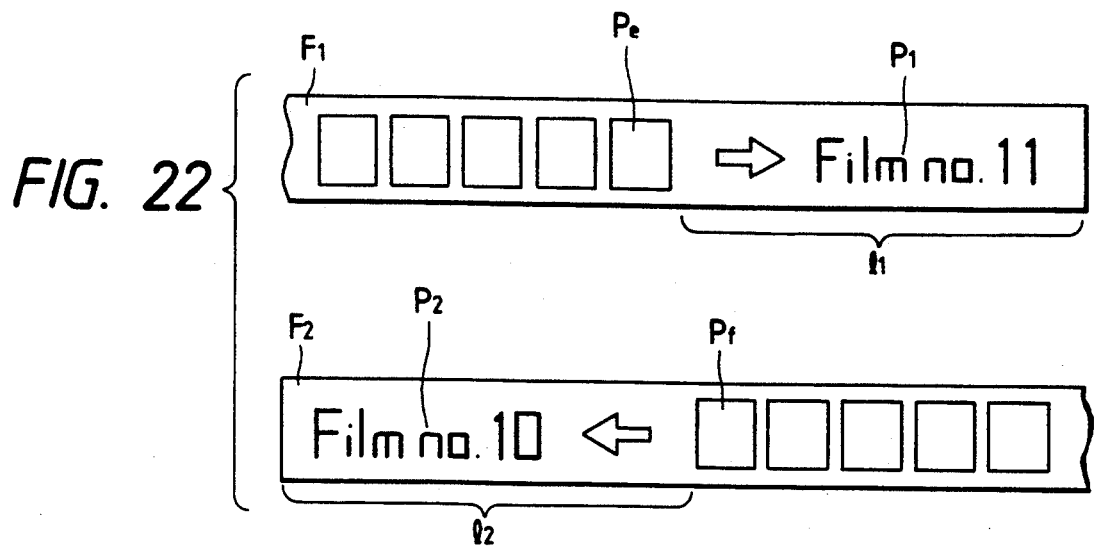
FIG. 22 shows a dual film recording status in a further embodiment.

FIG. 22 shows a further embodiment of the present invention.

The present embodiment is of the identical configuration as that of the previous embodiment except that a mark indicating the continued photographing and index data such as a film number are automatically recorded by known information recording means (not shown) such as an LED provided on or in the vicinity of the object light path at the end and start of the photographing at a rear portion $l_1$ of a final image Pe of the first exposed film F1 and at a front portion $l_2$ of a first image Pf of a second film F2. The recording of data may be done during the photographing to one film.

By recording the mark and data in the sequential photographing, the identification and retrieval of the films after developing are facilitated.

In accordance with the present invention, the simultaneous recording on a plurality of recording media is attained, and when the simultaneous recording is not necessary, the recording may be done separately to the respective recording media. Accordingly, when one recording medium is exhausted and the recording is terminated, the exchange and reloading of the recording media is not necessary and the recording may be continuously done on the other recording medium. Accordingly, the operability is improved and the recorder can be effectively utilized.

FIGS. 23 to 27 show another embodiment of the camera unit and the film transport mechanism.

Figure 23:
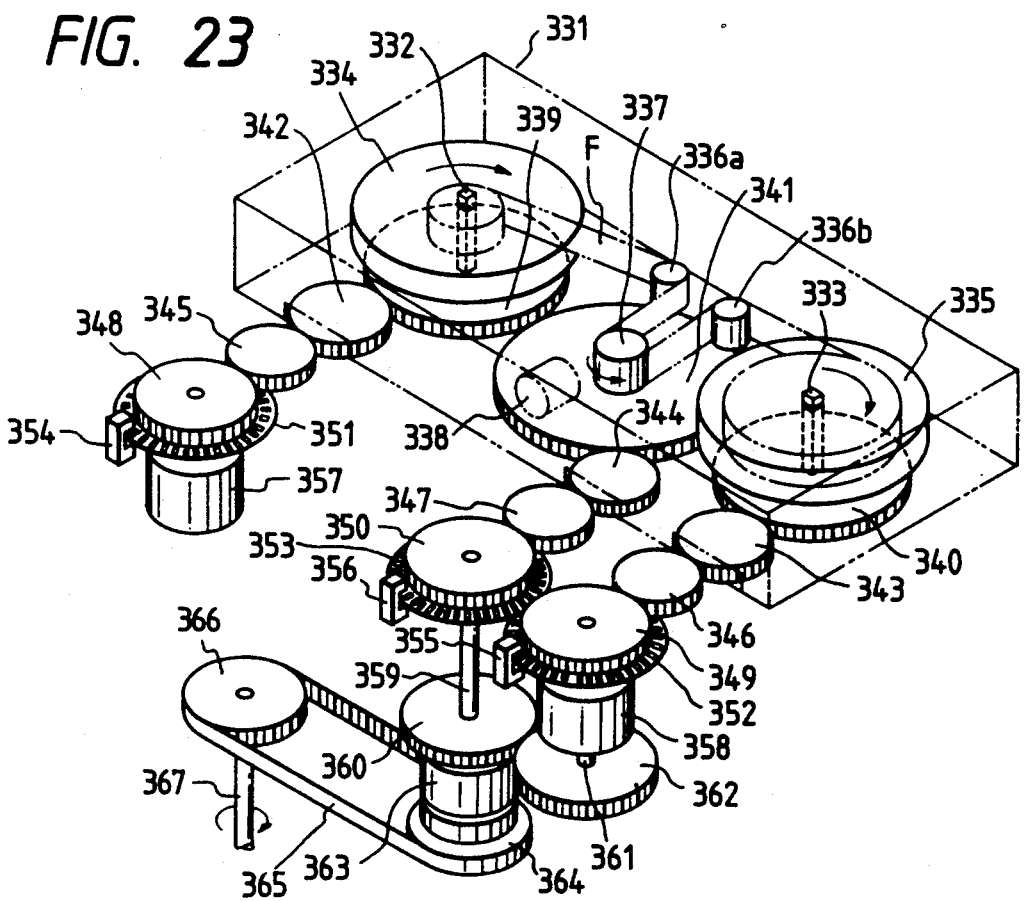
FIG. 23 shows a perspective view of a film drive unit a camera unit and a body of the photographing apparatus on which the camera unit is mounted in another embodiment of the present invention.
Figure 24:
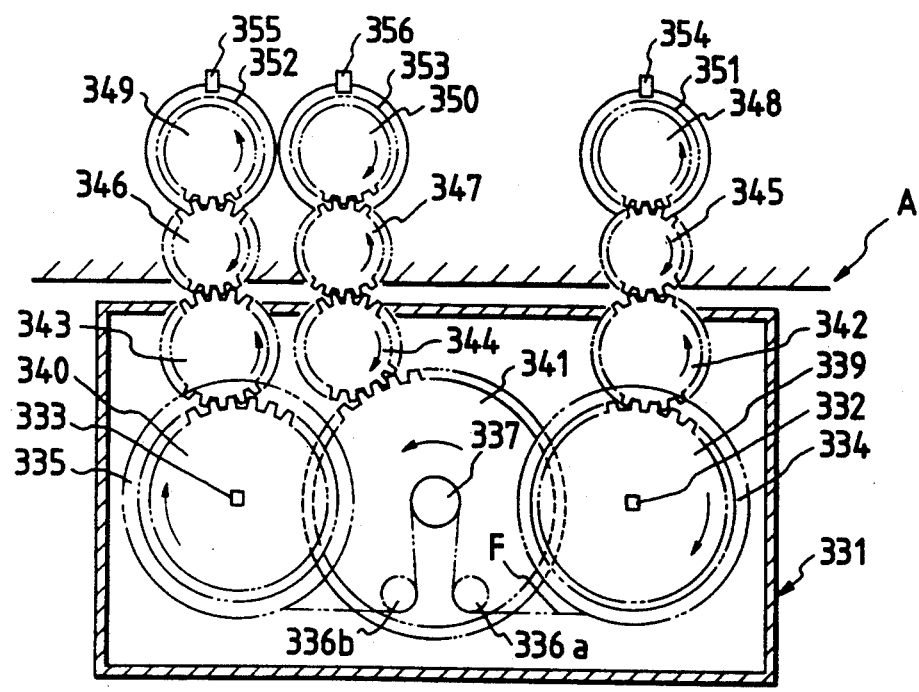
FIG. 24 shows a plan view thereof.

FIG. 23 shows a perspective view of a film drive unit of the camera unit (film loaded cassette) when it is mounted on the body of the photographing apparatus, and FIG. 24 shows a plan view thereof.

A light shielding cover (not shown) is pivotably attached to a camera unit 331, and a first reel 334 and a second reel 335 are mounted on a first reel shaft 332 and a second reel shaft 333, respectively, in the camera unit 331. Guide rollers 336a and 336b and a capstan roller 337 which serve as a transport mechanism for a film F are arranged between the reel shafts 332 and 333, and a lens 338 is arranged in front of a film exposure unit E on the capstan roller 337. Identical reel gears 339 and 340 are secured to the first reel shaft 332 and the second reel shaft 333, respectively, and a capstan gear 341 is secured to the roller shaft of the capstan roller 337 such that a portion thereof overlaps with the reel gears 339 and 340. Connecting gears 342, 343 and 344 mesh with the reel gears 339 and 340 and the capstan gear 341, respectively.

On the other hand, arranged on the body A of the photographing apparatus are gears 345, 346 and 347 which mesh with the connecting gears 342, 343 and 344 of the unit body 331 when the camera unit is mounted, and gears 348, 349 and 350 which mesh with the gears 345, 346 and 347, respectively. The gears 348, 349 and 350 have encoders 351, 352 and 353 integrally arranged therewith, and photo-interrupters 354, 355 and 356 are arranged to face the encoders 351, 352 and 353. Friction mechanisms 357 and 358 for applying constant rotation resistances are coupled to the gears 348 and 349. The gear 350 is secured to the shaft 359 on which the gear 360 is mounted, and the gear 360 meshes with the gear 362 secured to the rotating shaft 361 of the gear 349. A pulley 364 is mounted on the shaft 359 through an electromagnetic clutch 363 and the pulley 364 is coupled to a pulley 366 secured to the drive shaft 367 through a belt 365.

In the present embodiment, when the drive shaft 367 is rotated in the direction shown by an arrow by a drive source (not shown) in the body A of the apparatus, the pulley 364 coupled to the armature of the electromagnetic clutch 363 by the pulley 366 and the belt 365 is rotated.

When the electromagnetic clutch 363 is actuated, the armature is attracted and the rotation of the pulley 364 is transmitted to the shaft 359 so that the rotation of the gear 350 secured to the shaft 359 is transmitted to the capstan gear 341 in the unit body 331 through the gears 347 and 344. As a result, the capstan roller 337 is rotated in the direction shown by an arrow (counter-clockwise). On the other hand, the gear 362 is rotated by the gear 360 secured to the shaft 359 and the rotation of the gear 362 is transmitted to the gear 349 through the friction mechanism 358 and further transmitted to the reel gear 340 in the unit body 331 so that the second reel 335 mounted on the second reel shaft 333 is rotated to take up the film F.

When the film F is transported by the rotations of the capstan roller 337 and the second reel 335, the first reel 334 is rotated in the direction shown by the arrow so that the rotation of the reel gear 339 secured to the first reel shaft 332 is transmitted to the gear 348 through the gears 342 and 345. Accordingly, the film F in the unit body 331 is transported with an appropriate tension applied by the friction mechanisms 357 and 358 coupled to the gears 348 and 349, respectively.

The rotations of the capstan roller 327, the first reel shaft 332 and the second reel shaft 333 may be detected indirectly by detecting the rotations of the gears 350, 348 and 349 by rotation detection means comprising encoders 353, 351 and 352 and photointerrupters 356, 354 and 355 which are coupled to the gears 350, 348 and 349 of the body A of the apparatus. The rotation of the gear 350 for the rotation of the capstan is constant, and the rotations of the gears 348 and 349 for the rotations of the first reel shaft 332 and the second reel shaft 333 are varied by the film diameters on the first and second reels 334 and 335 mounted on the respective reel shafts. Accordingly, the control of the transport of the film in the unit or the detection of the remainder of the film may be attained by comparing and measuring the time intervals of the pulses generated by the rotation detection means of the gears and the changes thereof.

As shown in FIG. 24, since a portion of the capstan gear 341 overlaps with the reel gears 339 and 340, the size of the unit body 331 can be reduced.

In the present embodiment, the lens 338 is arranged in the unit body 331 although it may be arranged in the body A of the photographing apparatus.

Figure 25:
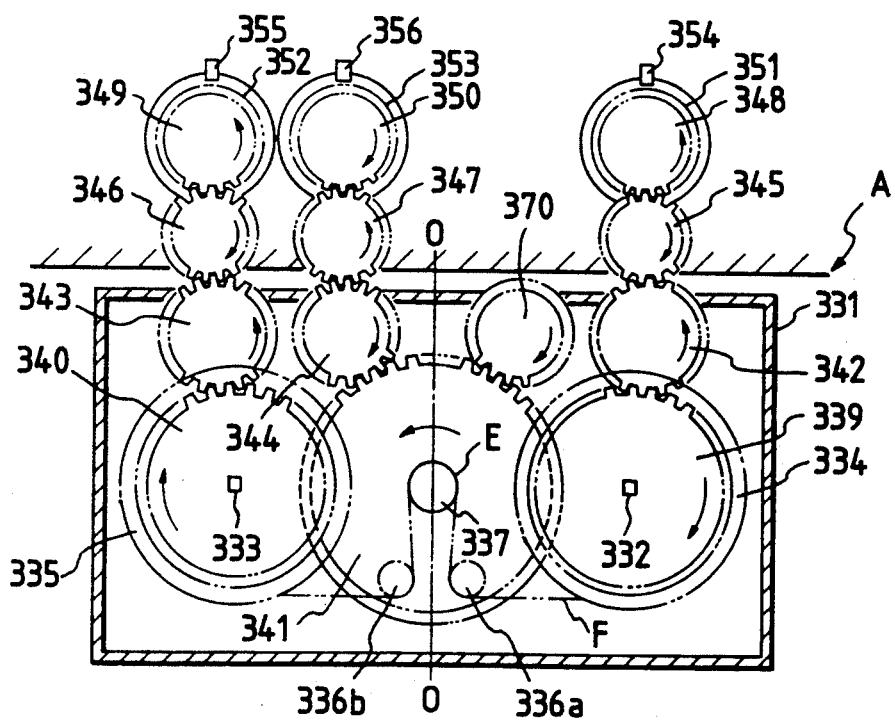
FIG. 25 shows a plan view of a film drive unit for a camera unit and a body of the photographing apparatus on which the camera unit is mounted in another embodiment.
Figure 26:
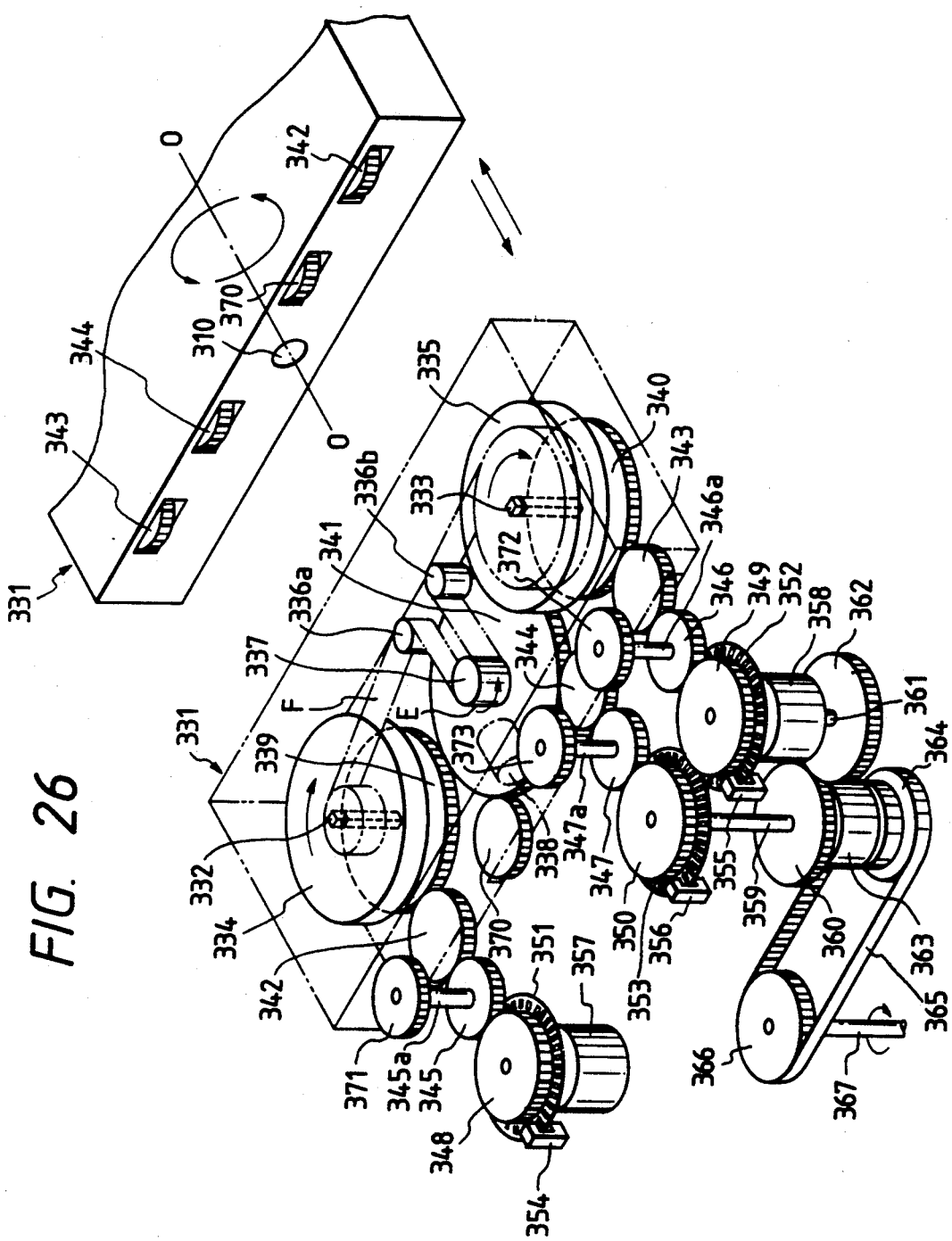
FIG. 26 shows a plan view thereof.

FIGS. 25 and 26 show a further embodiment of the present invention. The like elements to those shown in the embodiment of FIGS. 23–24 are designated by the like numerals and only the differences are explained below.

In the present embodiment, a gear 370 which is identical to a capstan gear 341 in the unit body 331 is arranged at a symmetric position to a gear 344 which meshes with the capstan gear 341, with respect to an optical axis of the lens 348. The first and second reel shafts 332 and 333, the reel gears 339 and 340 and the connecting gears 342 and 343 are also arranged symmetrically with respect to the optical axis of the lens 338. Gears 371, 372 and 373 which are identical to the gears 345, 346 and 347, respectively, are secured to the gears 345, 346 and 347 in the body A of the photographing apparatus which mesh with the connecting gears 342, 343 and 344 in the unit, through the shafts 345a, 346a and 347a. The configuration is identical to that of the previous embodiment.

In the present embodiment, the unit body 331 may be mounted in the body A of the apparatus in a first attitude in which the unit body 331 is rotated by 180 degrees with respect to the optical axis 0 of the lens 338. In this case, the gears 343, 342 and 370 in the unit mesh with the gears 371, 372 and 373 in the body A of the apparatus.

In the duo photographing, a supply reel is mounted on the first reel shaft 332 and a take-up reel is mounted on the second reel shaft 333. One side (half width) of the film F is first used for the photographing, and when the one side of the film has been photographed, the unit is unloaded from the body A and it is reloaded at a second attitude in which the unit is rotated by 180 degrees with respect to the optical axis 0. Thus, the positions of the first reel shaft 332 and the second reel shaft 333 are reversed in the unit and the supply reel and the take-up reel are interchanged. Thus, the other half side of the film F can be used for photographing. As a result, the duo photographing is attained without unloading and reloading the film, and the amount of film exposures is reduced and the operability is improved.

The gears 345 and 371, the gears 346 and 372 and the gears 347 and 373 may be integral gears, respectively.

Figure 27:
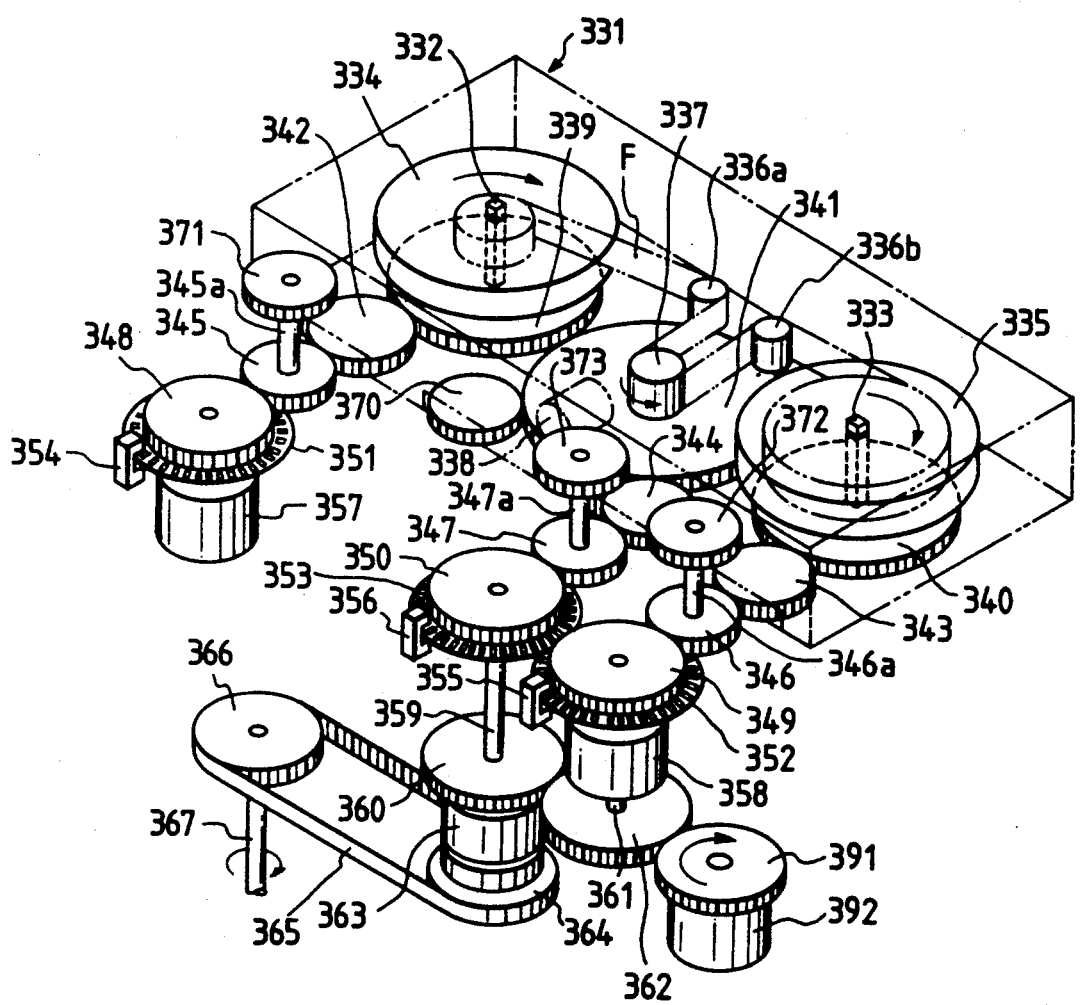
FIG. 27 shows a perspective view of a film drive unit for a camera unit and a body of the photographing apparatus on which the camera unit is mounted in a further embodiment.

FIG. 27 shows another embodiment of the present invention. The like elements to those shown in the embodiment of FIGS. 25 and 26 are designated by the like numerals and only the differences are explained below.

In the present embodiment, the gear 362 in the body A of the photographing apparatus is arranged to mesh with the gear 371 coupled to the motor 372. Other configuration is identical to that of the previous embodiment.

In the present embodiment, the rotation of the drive shaft 367 is transmitted to the pulley 364 by the pulley 366 and the belt 365, but when the electromagnetic clutch 363 is deactuated, the pulley 364 makes idle rotation and the rotation is not transmitted to the shaft 359. When the gear 371 is driven in the direction of the arrow by the motor 372 under this state, the rotation is transmitted to the gears 362 and 360 and the film F is transported in the same manner as that in the previous embodiment.

In the leader feed and the trailer feed of the film other than the film feed during the photographing, the electromagnetic clutch 363 is deactuated and the gears 362 and 360 are rotated at a higher rotating speed by a separate drive source (motor 372) so that the film is fast fed to shorten the leader feed and trailer feed times.

In accordance with the present invention, the rotation detection means for the capstan roller and the reel shafts and the friction mechanisms for the reel shafts are arranged in the body of the photographing apparatus through the rotation transmission means. Thus, the construction of the camera unit is simplified, the weight is reduced and the size is reduced. In addition, the manufacturing cost of the camera unit is significantly reduced. Accordingly, the economic effect is high particularly when a plurality of units are exchangeably used with the body of the photographing apparatus.

What is claimed is:

1. A recording apparatus for recording a document to a recording medium comprising:
 a first holding unit for removably holding a first recording unit having a recording medium and a photographing lens;
 a second holding unit for removably holding a second recording unit having a recording medium and a photographing lens having a different reduction factor other than that of the photographing lens of said first recording unit; and
 transport means for transporting the recording medium in said first and second recording units held by said first and second holding units at different speeds.

2. A recording apparatus according to claim 1 further comprising input means for inputting the reduction factors of the recording units held by the holding units.

3. A recording apparatus according to claim 2, wherein said transport means transports the recording medium at speeds corresponding to the inputted reduction factors.

4. A recording apparatus according to claim 1, wherein said transport means simultaneously transports the recording medium of the recording units.

5. A recording apparatus according to claim 4, wherein said transport means is a motor and includes drive transmission means for transmitting a driving force of the motor to the recording units.

6. A recording apparatus according to claim 5, wherein each of the recording units has a transport roller for transporting the recording medium by the driving force for the drive transmission means, and the transport rollers of the respective recording units are rotated at different speed from each other.

7. A recording apparatus for recording a document to a recording medium comprising:
 a first holding means for removably holding a first recording unit for housing a recording medium;
 a second holding unit for removably holding a second recording unit for housing a recording medium;
 detection means for detecting amounts of unused recording medium in said first and second recording units held by said first and second holding units, respectively;
 transport means for independently transporting the recording medium in said first and second recording units held by said first and second holding means; and
 means for controlling said transport means to selectively transport the recording medium of said first and second recording units in accordance with the amount of recording medium detected by said detection means.

8. A recording apparatus according to claim 7, further comprising means for inhibiting the recording to the recording medium in one recording unit and initiating the recording to the recording medium in the other recording unit when it is detected that the amount of unused recording medium in the one recording unit has reached a predetermined amount.

9. A recording apparatus according to claim 7, wherein each of the recording units has a lens for projecting the document to the recording medium.

10. A recording apparatus comprising:
 first holding means for removably holding a recording unit having a first shaft for rotatably holding a supply reel having a recording medium wound thereon, a second shaft for rotatably holding a take-up reel and a capstan roller for transporting the recording medium from the supply reel to the take-up reel;
 second holding means for removably holding a recording unit of the same construction as that of said recording unit;
 first drive means arranged in a body of said apparatus for transmitting driving forces to the first shaft, the second shaft and the capstan roller of the recording unit hold by said first holding means; and
 second drive means arranged in the body of said apparatus for transmitting driving forces to the first shaft, the second shaft and the capstan roller of the recording unit held by said second holding means.

11. A recording apparatus according to claim 10, wherein each of the recording units has a first gear coupled to the firs shaft, a second gear coupled to the second shaft and a third gear coupled to the capstan roller, and a portion of each gear is exposed to the external of a case of the recording unit.

12. A recording apparatus according to claim 11, wherein each of said first and second drive means has a plurality of gears for coupling to the first gear, the second gear and the third gear.

13. A recording apparatus according to claim 10, wherein each of the holding means selectively holds the recording unit at a first position and a second position inverted to the first position.

14. A recording apparatus according to claim 13, wherein each of the first and second drive means is able to transmit the driving forces to the first shaft, the second shaft and the capstan roller of the recording unit at any of the first and second positions.

15. A recording apparatus according to claim 10, further comprising means arranged in a body of said apparatus for detecting amounts of rotation of the first shaft, the second shaft and the capstan roller.

16. A recording apparatus according to claim 11, wherein each of the recording units has a photographing lens, and the first, second and third gears are arranged symmetrically around an optical axis of the photographing lens.

17. A recording apparatus according to claim 10, wherein each of said first and second drive means transmits the driving forces to the first and second shafts through friction transmission mechanisms.

* * * * *

UNITED STATES PATENT AND TRADEMARK OFFICE
CERTIFICATE OF CORRECTION

PATENT NO. : 5,208,627
DATED : May 4, 1993
INVENTOR(S) : YOSHIHIKO YOSHIHARA, ET AL.

It is certified that error appears in the above-identified patent and that said Letters Patent is hereby corrected as shown below:

COLUMN 1

Line 18, "image" should read --images--.
Line 29, "one-side" should read --a one-sided--.
Line 33, "due" should read --duo--.

COLUMN 2

Line 32, "mediums" should read --media--.

COLUMN 3

Line 16, "unit" should read --unit for--.
Line 38, "a gravity" should read --gravity--.

COLUMN 5

Line 41, "magnifications" should read --magnification--.

COLUMN 6

Line 15, "reader feed" should read --leader feed--.

COLUMN 10

Line 29, "in," should read --in--.

COLUMN 11

Line 37, "other" should read --another--.

UNITED STATES PATENT AND TRADEMARK OFFICE
CERTIFICATE OF CORRECTION

PATENT NO. : 5,208,627

DATED : May 4, 1993

INVENTOR(S) : YOSHIHIKO YOSHIHARA, ET AL.    Page 2 of 2

It is certified that error appears in the above-identified patent and that said Letters Patent is hereby corrected as shown below:

COLUMN 15

Line 23, "claim 1" should read --claim 1,--.
   Line 42, "speed" should read --speeds--.

COLUMN 16

Line 10, "the" (first occurrence) should read
          --an image of a--.
   Line 25, "hold" should read --held--.
   Line 32, "firs" should read --first--.

Signed and Sealed this

Nineteenth Day of April, 1994

Attest:

BRUCE LEHMAN

*Attesting Officer*    *Commissioner of Patents and Trademarks*